US009299116B2

United States Patent
Williams

(10) Patent No.: US 9,299,116 B2
(45) Date of Patent: Mar. 29, 2016

(54) TRIP PLAYLIST MANAGEMENT SYSTEMS AND METHODS

(71) Applicant: Verizon and Redbox Digital Entertainment Services, LLC, Basking Ridge, NJ (US)

(72) Inventor: Gareth Williams, Orange, CA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 261 days.

(21) Appl. No.: 13/852,421

(22) Filed: Mar. 28, 2013

(65) Prior Publication Data

US 2014/0298169 A1    Oct. 2, 2014

(51) Int. Cl.
  *G06F 3/048* (2013.01)
  *G06Q 50/10* (2012.01)
  *H04N 21/258* (2011.01)
  *H04N 21/262* (2011.01)
  *H04N 21/414* (2011.01)
  *H04N 21/482* (2011.01)

(52) U.S. Cl.
  CPC ......... *G06Q 50/10* (2013.01); *H04N 21/25841* (2013.01); *H04N 21/26258* (2013.01); *H04N 21/41407* (2013.01); *H04N 21/4825* (2013.01)

(58) Field of Classification Search
  CPC ............................ H04N 5/44543; G11B 27/34
  USPC .......................................................... 715/716
  See application file for complete search history.

(56) References Cited

U.S. PATENT DOCUMENTS

| | | | |
|---|---|---|---|
| 2009/0055426 A1* | 2/2009 | Kalasapur et al. | 707/102 |
| 2009/0158342 A1* | 6/2009 | Mercer et al. | 725/46 |
| 2009/0292376 A1* | 11/2009 | Kazem et al. | 700/94 |
| 2012/0166377 A1* | 6/2012 | Sathish et al. | 706/47 |
| 2012/0221687 A1* | 8/2012 | Hunter et al. | 709/219 |
| 2013/0031162 A1* | 1/2013 | Willis et al. | 709/203 |
| 2013/0151462 A1* | 6/2013 | Ledlie | 706/54 |
| 2013/0246419 A1* | 9/2013 | Kwak et al. | 707/736 |
| 2013/0294745 A1* | 11/2013 | Xu et al. | 386/241 |
| 2014/0031961 A1* | 1/2014 | Wansley et al. | 700/94 |

* cited by examiner

*Primary Examiner* — David Phantana Angkool

(57) ABSTRACT

An exemplary method includes a computer-implemented trip playlist management system receiving data representative of a travel itinerary for a trip and generating, based on the data representative of the travel itinerary, a recommended trip playlist for the trip, the recommended trip playlist comprising a set of one or more media programs selected and arranged relative to a timeline for the trip. In certain examples, the computer-implemented trip playlist management system provides a trip playlist graphical user interface for display, the trip playlist graphical user interface comprising a visual representation of the recommended trip playlist. Corresponding methods and systems are also disclosed.

23 Claims, 14 Drawing Sheets

TRIP PLAYLIST MANAGEMENT SYSTEMS AND METHODS

BACKGROUND INFORMATION

A common use of mobile computing devices such as smart phones, tablet computers, and laptop computers is for personal consumption of media content while traveling. For example, it is not uncommon to see a person traveling on a bus, train, or airplane use a mobile computing device to watch video content (e.g., a movie or television program) and/or listen to audio content (e.g., music or an audio book).

In advance of a planned trip, a person may manually seek out and load digital media content onto a mobile computing device such that the digital media content will be available for consumption by the user during the trip. For example, before beginning a trip that includes an airplane flight, a person may load a movie onto a mobile computing device so that he or she can watch the movie during the flight.

However, such manual preparation may be inconvenient, overlooked, or intentionally skipped when a person is busy planning and doing other things to prepare for a trip. Moreover, manually seeking out and loading digital media content onto a mobile computing device may be time consuming, difficult, and/or undesirable for some people.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary trip playlist management systems and methods are described herein. The exemplary systems and methods described herein may automatically generate a recommended trip playlist based at least in part on data representative of a travel itinerary for a trip, which may include a journey from one geographic location to another geographic location. The recommended trip playlist may include a set of one or more media programs recommended to a user for the trip. As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video, movie, audio program, song, audio book, radio program, or any other media program that may be accessed and played back by a mobile computing device for experience by a user. Examples of generating a recommended trip playlist based on data representative of a travel itinerary for a trip are described herein.

Additionally or alternatively, the exemplary systems and methods described herein may provide a trip playlist user interface that includes a visual representation of a recommended trip playlist. The trip playlist user interface may further include one or more tools configured to facilitate user management and utilization of the recommended trip playlist. Exemplary views of such a trip playlist user interface are described herein.

By automatically generating a recommended trip playlist based on a travel itinerary for a trip and/or providing a trip playlist user interface, the systems and methods described herein may leverage the travel itinerary to automatically perform one or more operations configured to find and recommend media programs to a user for the trip, facilitate user access to the recommended media programs, and/or facilitate user management a trip playlist of the recommended media programs. This may reduce the time and/or effort that would otherwise be spent by the user to find and access media programs to experience during the trip.

Examples of trip playlist management systems and methods, as well as exemplary views of trip playlist graphical user interfaces ("GUIs") provided by the systems and methods will now be described in reference to the accompanying drawings.

Figure 1:
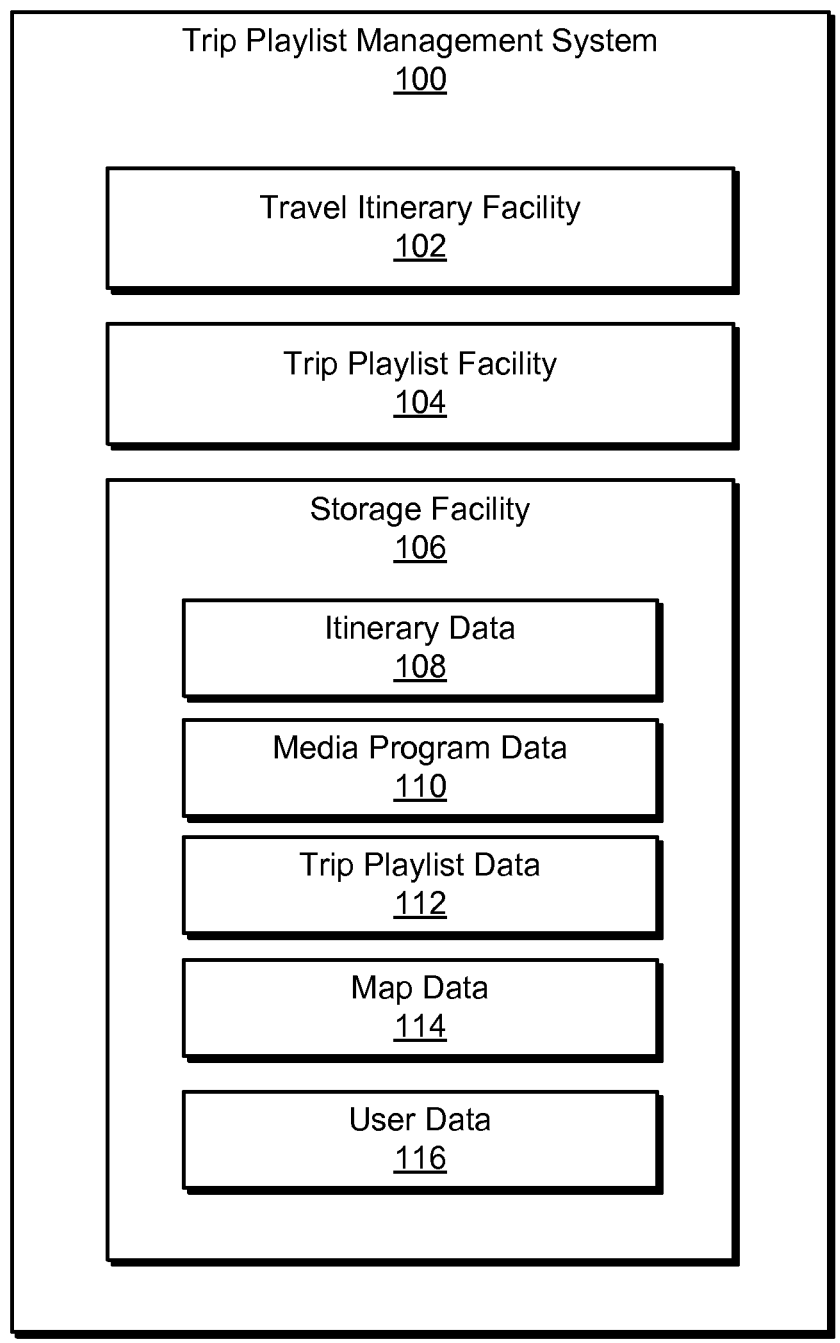
FIG. 1 illustrates an exemplary trip playlist management system according to principles described herein.

FIG. 1 illustrates an exemplary trip playlist management system 100 ("system 100"). As shown, system 100 may include, without limitation, a travel itinerary facility 102, a trip playlist facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Facilities 102-106 of system 100 may include or be implemented by one or more computing devices. Exemplary implementations of system 100 are described in more detail herein.

Storage facility 106 may be configured to store data generated and/or used by travel itinerary facility 102 and/or trip playlist facility 104. For example, storage facility 106 may store itinerary data 108 representative of one or more travel itineraries, media program data 110 representative of a collection of media programs (e.g., metadata for media programs offered by a media distribution service and/or included in a library of media programs), trip playlist data 112 representative of one or more recommended trip playlists generated by trip playlist facility 104 and/or managed by a user of system 100, map data 114 representing information about a mapped geographic space, and user data 116 representing information about one or more users. Storage facility 106 may store additional or alternative data as may serve a particular implementation.

The data stored by storage facility 106 may be accessed by system 100 from any suitable source, including sources internal or external to system 100. Storage facility 106 may permanently or temporarily store data. In certain examples, system 100 may access certain data from a source external to system 100 and temporarily store the data in storage facility 106 for use by travel itinerary facility 102 and/or trip playlist facility 104. In certain examples, data generated by travel itinerary facility 102 and/or trip playlist facility 104 may be stored permanently or temporarily to storage facility 106.

Travel itinerary facility 102 may be configured to receive data representative of a travel itinerary in any suitable way and from any suitable source. As an example, travel itinerary facility 102 may be configured to provide a user interface (e.g., a travel itinerary input GUI) through which a user may manually input data representative of a travel itinerary.

As another example, travel itinerary facility 102 may receive, by way of a communication service, one or more communication messages carrying data representative of a travel itinerary. For instance, travel itinerary facility 102 may receive data representative of a travel itinerary in an e-mail message, text message, social networking message, and/or any other suitable type of communication message. To this end, in certain examples, travel itinerary facility 102 may provide an addressable messaging destination, such as an e-mail address, a text messaging address, a social networking messaging address, and/or any other communication message address to which a communication message carrying data representative of a travel itinerary may be sent.

Accordingly, a user may send a message carrying data representative of a travel itinerary to travel itinerary facility 102 in any suitable way. For example, the user may utilize a travel service provided by a travel service provider to create a travel itinerary for a trip, receive data representative of the travel itinerary from the travel service, and forward the data representative of the travel itinerary to travel itinerary facility 102 by way of a communication message, such as described above. Examples of a travel service may include, without limitation, an airline service, a bus service, a train service, a boat service, a mapping service, a direction service, a trip planning service, and/or a travel agency service provided by a travel service provider and/or a travel service provider computing system for use by a user.

In certain examples, a computing system operated by a travel service provider may be configured to automatically send a communication message carrying data representative of a travel itinerary to travel itinerary facility 102. For example, a user may configure settings of a user account with a travel service used by the user such that the computing system associated with the travel service is configured to automatically send a travel itinerary for the user to travel itinerary facility 102, such as in response to the travel service computing system generating the travel itinerary for the user.

To illustrate an example, a user may use a travel service to reserve a seat on an airline flight. A computing system associated with the travel service may provide data representative of the airline flight (i.e., a travel itinerary for the airline flight) to the user, and the user may send data representative of the airline flight to travel itinerary facility 102 in any of the ways described above. Additionally or alternatively, the computing system associated with the travel service may automatically provide data representative of the airline flight to travel itinerary facility 102 in response to the reservation of a seat on the airline flight.

To illustrate another example, a user may use a travel service such as a service provided by a mapping application to request driving directions from one geographic location to another geographic location. A computing system associated with the travel service may provide data representative of the driving directions (i.e., a travel itinerary for a drive) to the user, and the user may send data representative of the driving directions to travel itinerary facility 102 in any of the ways described above. Additionally or alternatively, the computing system associated with the travel service may automatically provide data representative of the driving directions to travel itinerary facility 102 in response to the generation of the driving directions.

Data representative of a travel itinerary may define a trip that includes a defined travel path that may be physically traveled by a user between two or more geographic locations. The data representative of the travel itinerary may specify elements of the trip. The trip elements may include geographic locations associated with the trip, such as geographic locations included along the defined path of travel. Examples of such geographic locations may include, without limitation, locations of places of departure (e.g., a trip departure location), waypoints (e.g., a trip waypoint location), destinations (e.g., a trip destination location), airports, bus stations, train stations, boat docks, homes, places of business, hotels, etc.

Additionally or alternatively, the trip elements may include modes of transportation for the trip. For example, the travel itinerary may specify modes of transportation such as air travel, bus travel, train travel, automobile travel, boat travel, walking, bicycle travel, etc.

Additionally or alternatively, the trip elements may include time elements of the trip. For example, the travel itinerary may specify a timeline associated with the trip. The timeline may include departure times, arrival times, and travel duration times. The times may include scheduled, estimated, and/or actual travel times.

Additionally or alternatively, the trip elements may include service providers associated with the trip. For example, the travel itinerary may specify what service providers will be providing transportation services, accommodations, etc. To illustrate, the travel itinerary may specify an airline that will provide air travel services, a car rental company that will provide car rental services, and a hotel that will provide lodging services.

A trip may include one or more distinct trip segments. For example, a trip may include a first airline flight segment followed by a second airline flight segment. Accordingly, a travel itinerary may specify trip elements in the form of one or more distinct trip segments arranged to form the trip. A trip segment may include, without limitation, a flight, bus trip, train trip, boat trip, automobile trip, walking segment, bicycle route, outbound segment, inbound segment, and/or any other segment of an overall travel path for the trip. The travel itinerary may define a combination of such trip segments to form an overall travel path for the trip. The travel itinerary may specify an association between each trip segment and one or more other trip elements, such as time elements, geographical locations, and/or travel mode(s) associated with each trip segment.

Travel itinerary facility 102 may be configured to perform any suitable processing of received data representative of a travel itinerary. For example, travel itinerary facility 102 may store data representative of the travel itinerary (e.g., as itinerary data 108 in storage facility 106) and/or provide data representative of the travel itinerary to trip playlist facility 104.

Trip playlist facility 104 may be configured to generate, based at least in part on data representative of a travel itinerary for a trip, a recommended trip playlist for the trip. The recommended trip playlist ("trip playlist") may include a set of one or more media programs that are selected and arranged by trip playlist facility 104 based at least in part on the travel itinerary and recommended for experiencing by the user (e.g., during the trip).

Based on data representative of a travel itinerary for a trip, trip playlist facility 104 may select and arrange one or more media programs that are identified as being related to the trip to form a trip playlist. This may be performed in accordance with any suitable predefined criteria. For example, a trip playlist generation heuristic may be defined (e.g., by a manufacturer, operator, and/or end user of system 100) for use by trip playlist facility 104 and may specify criteria to be used by trip playlist facility 104 to identify, select, and arrange media programs related to a trip (e.g., related to one or more trip elements of the trip) to form a trip playlist based on a travel itinerary. Examples of such criteria and how the criteria may be used by trip playlist facility 104 to generate a trip playlist based on a travel itinerary will now be described.

In certain examples, the trip playlist generation heuristic may specify that one or more specific trip elements associated with a trip (and indicated by a travel itinerary for the trip) are to be used by trip playlist facility 104 to identify, select, and arrange media programs that are related to the trip elements for inclusion in a trip playlist for the trip. Accordingly, in accordance with the trip playlist generation heuristic, trip playlist facility 104 may identify relationships between media programs and trip elements associated with the trip. For example, trip playlist facility 104 may search media program data 110 and identify any media programs that are related to one or more trip elements associated with the trip.

Figure 2:
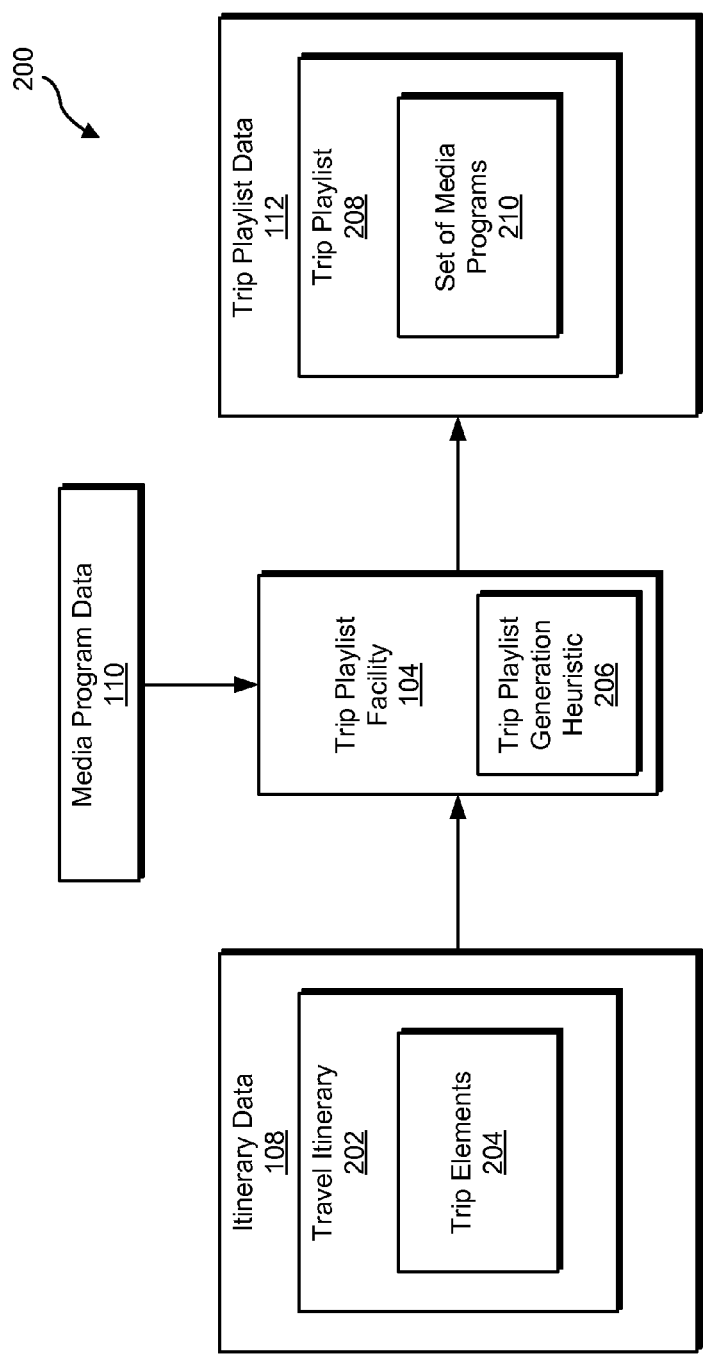
FIGS. 2-5 illustrate exemplary configurations in which a trip playlist facility generates a trip playlist based at least in part on data representative of a travel itinerary for a trip according to principles described herein.

FIG. 2 illustrates an exemplary configuration 200 in which trip playlist facility 104 accesses itinerary data 108 that includes data representative of a travel itinerary 202 that specifies a set of trip elements 204 for a trip. Trip playlist facility 104 may process the data representative of the travel itinerary 202 in accordance with a trip playlist generation heuristic 206, which processing may include accessing and searching media program data 110 to identify relationships between one or more media programs and one or more of the trip elements 204 and to select one or more of the media programs for inclusion in a recommended trip playlist. Trip playlist facility 104 may arrange the selected media programs to form a trip playlist 208 that includes the set of selected and arranged media programs 210. In this or a similar manner, trip playlist facility 104 may generate the trip playlist 208 of recommended media programs 210 for the trip based at least in part on the travel itinerary 202 for the trip. The trip playlist 208 may be represented as trip playlist data 112.

Trip elements specified by a travel itinerary may include any of the trip elements described herein, including any of the geographic locations, time elements, and modes of travel described herein that may be associated with a trip. Trip playlist facility 104 may use any set of these trip elements to identify relationships between the trip and one or more media programs. This may include using the trip elements as search criteria to search media program data 110 to identify media programs that are related to the trip elements. For instance, the media program data 110 may include metadata for a collection of media programs (e.g., a repository of media programs that are available to one or more users by way of a media distribution service), and trip playlist facility 104 may use trip elements as search criteria to search the metadata to identify media programs that are related to the trip elements. Trip playlist facility 104 may search all metadata fields or only specific metadata fields indicated by the trip playlist generation heuristic. As used herein, media program metadata may include any data descriptive of one or more media programs, including, without limitation, data representing media program titles, genres, themes, synopses, descriptions, ratings, user ratings, user comments, producers, directors, actors, cast members, filming locations, credits, electronic program guide data, participatory metadata generated based on user interaction with a media distribution service, and any other information about media programs.

As an example of trip playlist facility 104 using specific trip elements to identify relationships between a trip and one or more media programs, trip playlist facility 104 may identify relationships between one or more media programs and geographic locations associated with a trip. For example, trip playlist facility 104 may use geographic locations such as a trip departure location, a waypoint location, a destination location, and/or geographic location identifiers (e.g., names of geographical locations, such as a name of an airport or hotel) specified by a travel itinerary as search criteria to search media program data 110 and identify one or more media programs that are related to such geographic locations.

To illustrate, a geographic location known as Phoenix, Ariz. may be associated with a trip defined by a travel itinerary. Trip playlist facility 104 may search media program data 110 and identify any media programs that have a relationship with Phoenix, Ariz. For instance, trip playlist facility 104 may use "Phoenix" and/or "Arizona" as search criteria to search media program metadata to identify any media programs that include the search criteria in their respective metadata. Identified media programs, which may include media programs having "Arizona" in their titles, cast information (e.g., an actor name), descriptions, and/or other metadata fields, may be deemed by trip playlist facility 104 to have relationships with the Phoenix, Ariz. geographic location.

As another example of trip playlist facility 104 using specific trip elements to identify relationships between a trip and one or more media programs, trip playlist facility 104 may identify relationships between one or more media programs and time elements associated with a trip. For example, trip playlist facility 104 may use time elements such as departure times, arrival times, and/or travel times that define a timeline for the trip (and specified by a travel itinerary) as search criteria to search media program data 110 and identify one or more media programs that are related to such time elements.

To illustrate, a trip defined by a travel itinerary may include a non-stop airline flight from Phoenix, Ariz. to Chicago, Ill. The travel itinerary may specify a time of departure from Phoenix, Ariz. and a time of arrival at Chicago, Ill. Trip playlist facility 104 may use these times to compute a travel time for the flight. Trip playlist facility 104 may use the travel time as a basis to select and arrange media programs to form a trip playlist.

In certain examples, trip playlist facility 104 may adjust the computed travel time to account for corporate policies (e.g., an airline's policies) and/or governmental regulations regarding the use of electronic devices during a flight. For example, trip playlist facility 104 may subtract a predefined length of time from the computed travel time to account for times at the beginning and the end of the flight during which the use of electronic devices is prohibited. As an example, if the computed travel time is three hours and thirty minutes (3:30), trip playlist facility 104 may adjust this to three hours (3:00) of travel time during which a user is allowed to use an electronic portable device to consume media programs.

In certain examples, trip playlist facility 104 may make such an adjustment to the travel time based on which airline a user will fly with. To this end, airline information included in a travel itinerary may be leveraged by trip playlist facility 104 to determine how much to adjust the computed travel time to reflect the amount of time that a specific airline will allow passengers to use electronic portable devices during the flight. For example, trip playlist facility 104 may determine from data representative of a travel itinerary that a particular airline is providing a flight, look up data representative of the policies and/or practices of the airline to determine how much to adjust the flight time to reflect the amount of time that the specific airline will allow passengers to use electronic portable devices during the flight.

Trip playlist facility 104 may use the travel time in any suitable way to select and arrange media programs to form a trip playlist. In certain examples, trip playlist facility 104 may exclude, from the playlist, any media program or any combination of media programs that has a runtime that is longer than the travel time. In certain examples, trip playlist facility 104 may identify any media program or any combination of media programs that has a runtime that fits within the travel time for further consideration for inclusion in the trip playlist. In certain examples, trip playlist facility 104 may select and arrange one or more selected media programs along a timeline for a trip based on the travel time and on the runtime(s) of the media program(s).

To continue the example described above, for the three hour and thirty minute (3:30) flight from Phoenix, Ariz. to Chicago, Ill., trip playlist facility 104 may select and arrange multiple media programs that have a total runtime less than three hours (3:00), which is the adjusted travel time during which a user is allowed to use an electronic device to consume the media programs. For example, trip playlist facility 104 may determine that a first movie having a runtime of one hour and forty-five minutes (1:45) and a second movie having a runtime of one hour and twelve minutes (1:12) have a total runtime less than three hours (3:00). Based at least in part on this determination, trip playlist facility 104 may select the movies for inclusion in the trip playlist recommended for viewing during the flight.

As another example of trip playlist facility 104 using specific trip elements to identify relationships between a trip and one or more media programs, trip playlist facility 104 may identify relationships between one or more media programs and travel modes associated with a trip. For example, trip playlist facility 104 may use travel modes such as airline flights, bus rides, train rides, boat rides, etc. included in the trip and specified by a travel itinerary to identify search criteria to use to search media program data 110 and identify one or more media programs that are related to such travel modes.

To illustrate, a trip defined by a travel itinerary may include a non-stop airline flight from Phoenix, Ariz. to Chicago, Ill. Trip playlist facility 104 may identify an "airline flight" mode of travel from the travel itinerary and use terms such as "airline," "flight," "fly," and "airplane," as search criteria to search media program data 110 and identify one or more media programs that are related to air travel.

Figure 3:
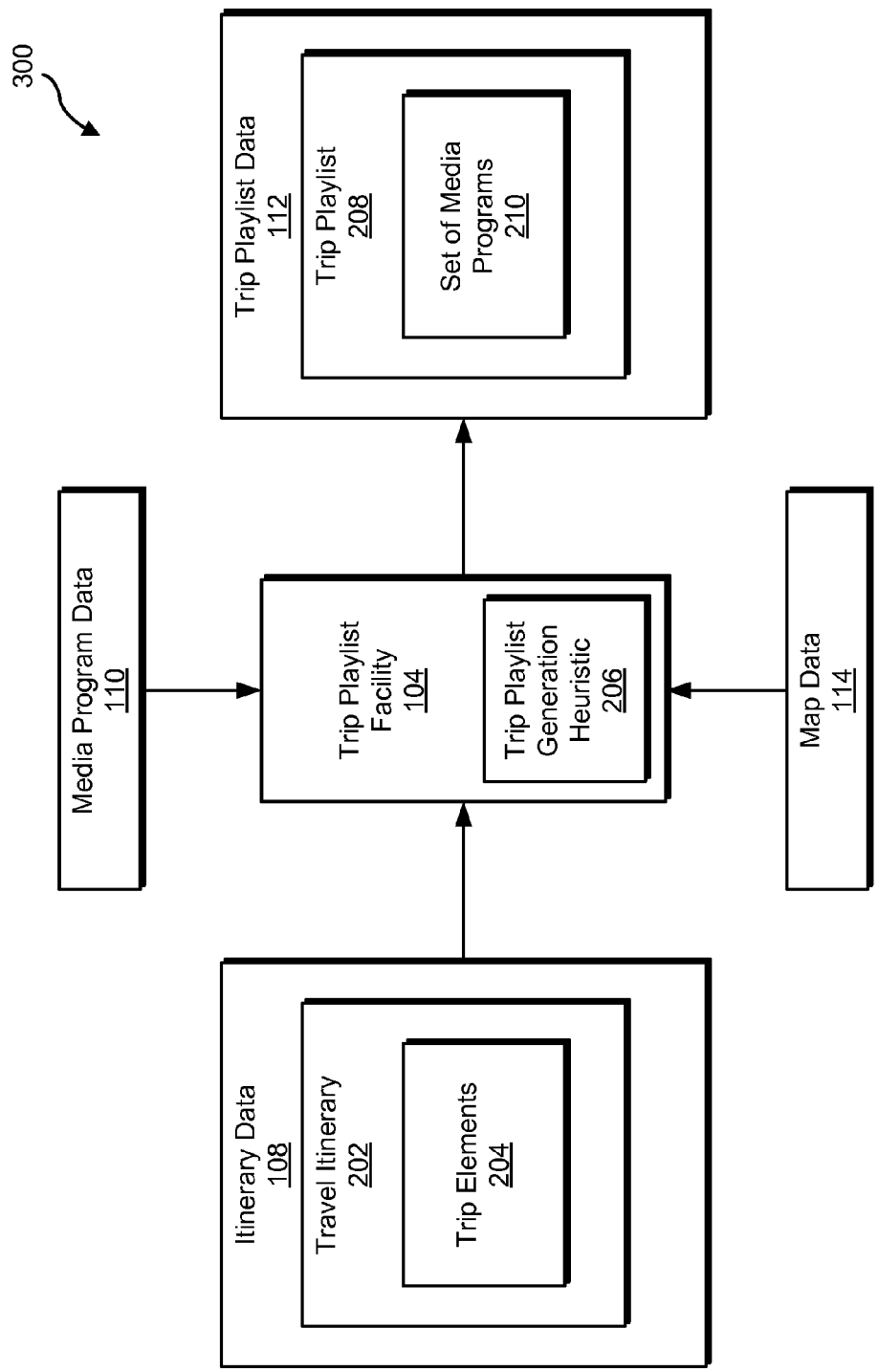

In certain examples, trip playlist facility 104 may use data representative of a travel itinerary for a trip in combination with other data to generate a trip playlist. As an example, trip playlist facility 104 may access and use map data representative of map information as an additional basis for generating a trip playlist. FIG. 3 illustrates a configuration 300 in which trip playlist facility 104 accesses and uses both itinerary data 108 and map data 114 to generate trip playlist 208. Map data 114 may include any data representative of geographic information, including geographic features and/or other features indicated by map data 114 and related to geographic locations.

Trip playlist facility 104 may use map data 114 in any suitable way as a basis for selecting and/or arranging media programs to form a trip playlist of media programs related to a trip. As an example, trip playlist facility 104 may use map data 114 to identify features associated with a geographic location specified by a travel itinerary. Trip playlist facility 104 may then use the identified features as search criteria to search media program data 110 and identify one or more media programs that have relationships with the geographic locations by way of the features.

To illustrate, a trip defined by a travel itinerary may include a non-stop airline flight from Phoenix, Ariz. to Chicago, Ill. Trip playlist facility 104 may use geographic locations associated with the flight (e.g., the departure location, the destination location, and/or the flight path) to search map data 114 and identify any map features that are geographically related to the flight. For example, based on the flight path, trip playlist facility 104 may determine from map data 114 that the flight path is over or otherwise proximate to a geological landmark such as the Grand Canyon. As another example, based on the destination location of Chicago, Ill., trip playlist facility 104 may identify, from map data 114, a landmark such as Wrigley Field that is associated with the destination location. Trip playlist facility 104 may use such identified landmarks as search criteria to search media program data 110 and identify any media programs that are related to the landmarks. Thus, trip playlist facility 104 may identify media programs that are related to the Grand Canyon and/or Wrigley Field.

Figure 4:
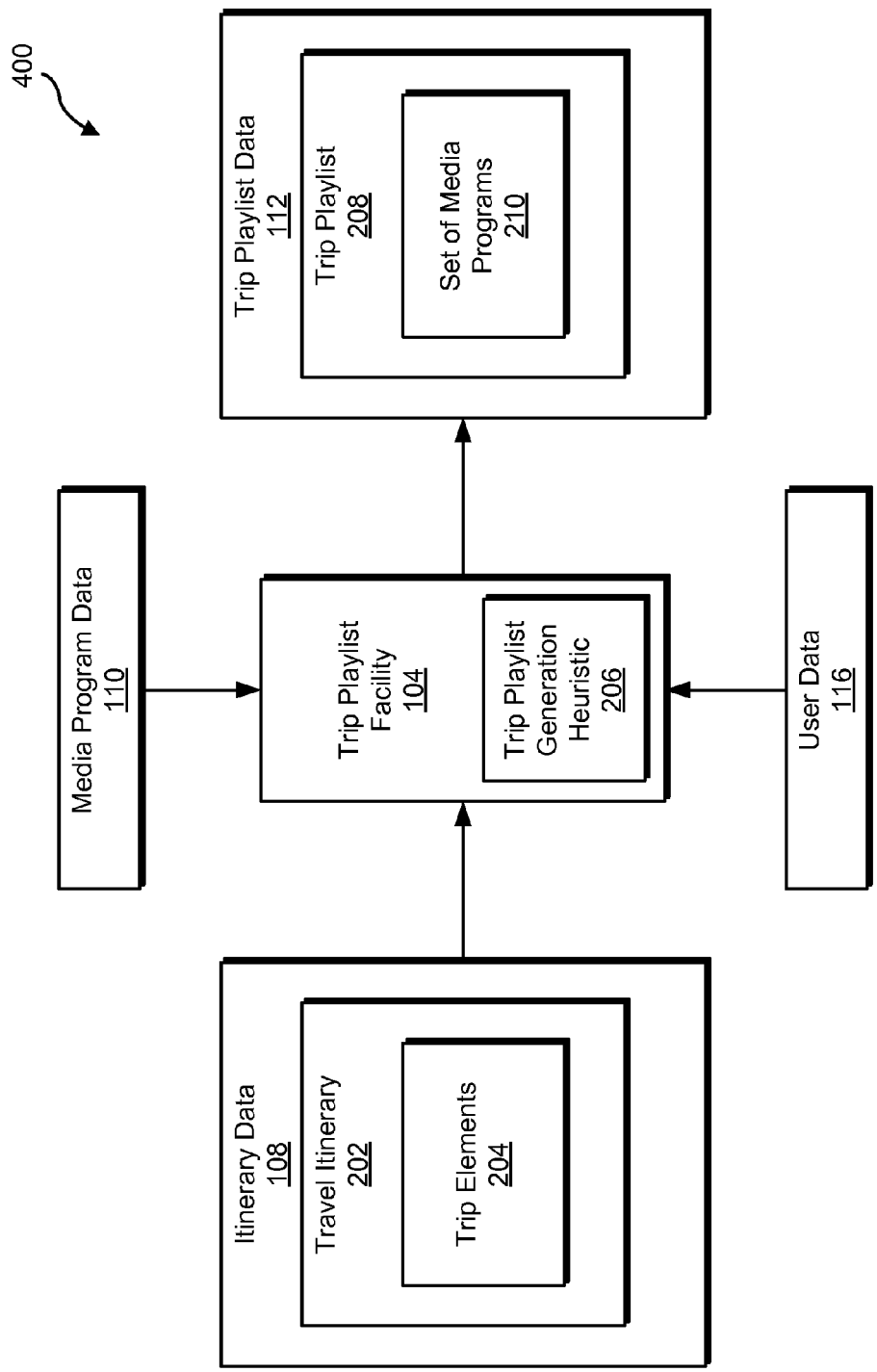

As another example, trip playlist facility 104 may access and use user data representative of information about a user as an additional basis for generating a trip playlist. FIG. 4 illustrates a configuration 400 in which trip playlist facility 104 accesses and uses both itinerary data 108 and user data 116 to generate trip playlist 208. User data 116 may include any data representative of information about a user. For example, user data 116 may include a user profile, user preferences regarding media programs, a user's history of accessing and/or consuming media programs, demographic information about a user, and/or any other information about a user.

Trip playlist facility 104 may use user data 116 in any suitable way as a basis for generating a trip playlist of media programs related to a trip. As an example, trip playlist facility 104 may use user data 116 to identify media programs and/or types of media programs that are or may be of interest to a user. Additionally or alternatively, trip playlist facility 104 may use user data 116 to identify media programs or types of media programs that are not or may not be of interest to the user. Trip playlist facility 104 may then use the identified media programs or types of media programs to select and/or arrange one or more media programs to form a trip playlist.

For example, user data 116 may specify that a user prefers to access media programs in a specific format (e.g., in high-definition). Trip playlist facility 104 may use this information to limit or filter search results for related media programs to include or prioritize media programs in the preferred format.

As another example, a user data 116 may indicate one or more media programs that have been recently experienced by the user. Trip playlist facility 104 may exclude such media programs from being included in a trip playlist.

As another example, user data 116 may indicate that a user has a preference for a particular type of media program, such as media programs in a comedy genre. Trip playlist facility 104 may use this information to include or prioritize media programs that are comedies for inclusion in a trip playlist.

Figure 5:
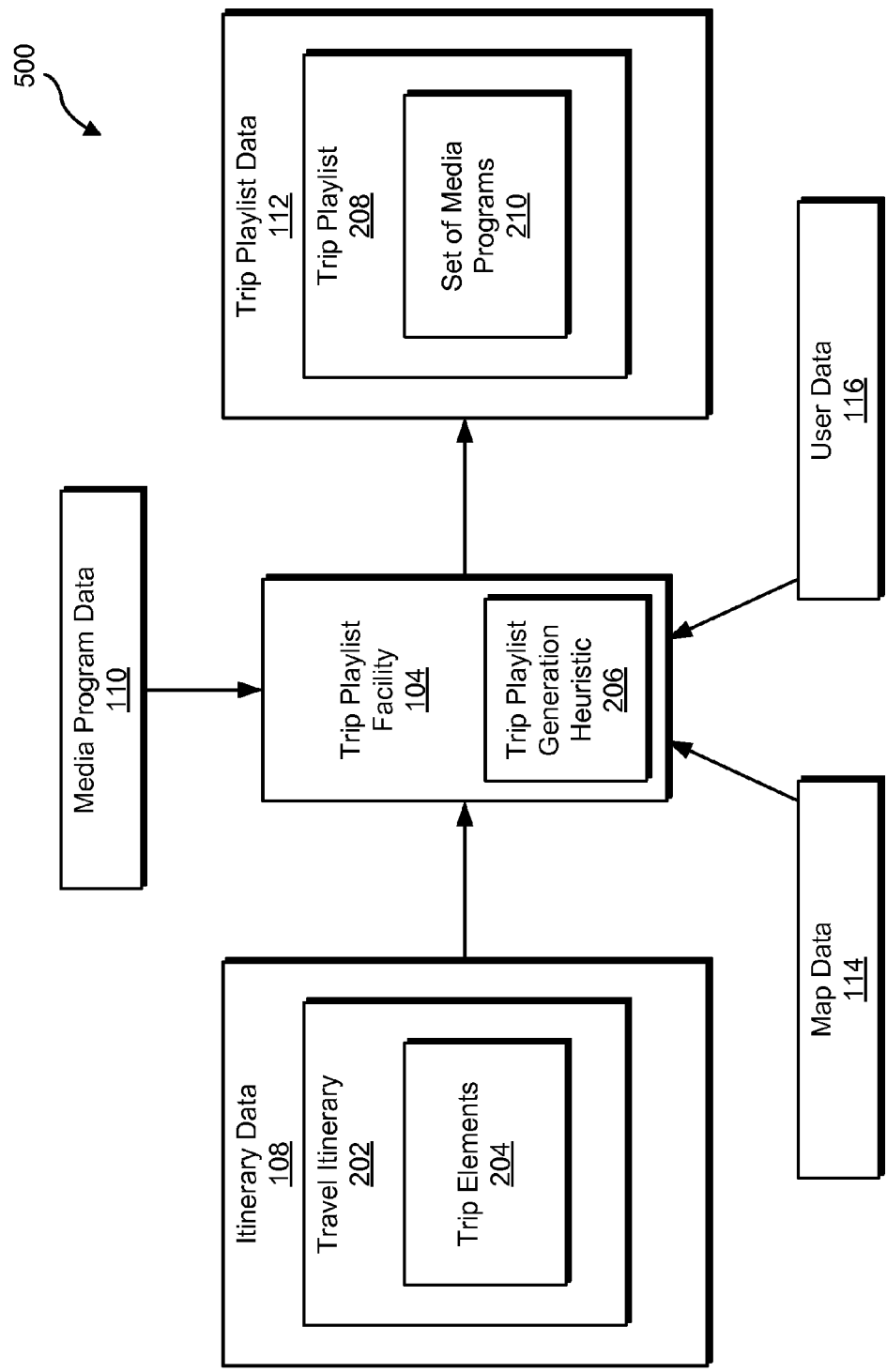

In certain examples, trip playlist facility 104 may use data representative of a travel itinerary for a trip in combination with both map data and user data to generate a trip playlist. FIG. 5 illustrates a configuration 500 in which trip playlist facility 104 actresses and uses itinerary data 108, map data 114, and user data 116 to generate trip playlist 208.

In certain examples, trip playlist facility 104 may use any combination or sub-combination of criteria, such as the exemplary criteria described herein, to generate a trip playlist based at least in part on data representative of a travel itinerary for a trip. This may include trip playlist facility 104 prioritizing one or more of the criteria in accordance with a prioritization specified by a trip playlist generation heuristic. For example, in certain embodiments, a trip playlist generation heuristic may specify primary and secondary criteria to be used to generate a trip playlist, and that the primary criteria are to be prioritized over the secondary criteria for generating the trip playlist.

The prioritization of search criteria, such as the prioritization of primary criteria over secondary criteria, may be used by trip playlist facility 104 to prioritize media programs in any suitable way. For example, trip playlist facility 104 may prioritize a media program that satisfies primary criteria over a media program that satisfies only secondary criteria for inclusion in a trip playlist.

As an example, the trip playlist generation heuristic may specify that a relationship of a geographic location associated with the trip to a title of a media program is a primary criterion to be prioritized over a relationship of the geographic location with a media program theme or genre. Accordingly, a title match may be prioritized over an indirect genre match (or over other secondary criteria such as a filming location match). For instance, for the Phoenix, Ariz. geographic location, a media program having a title that includes "Arizona" may be prioritized over a media program that is a Western genre, which genre is indirectly related to Phoenix, Ariz. (e.g., by Phoenix, Ariz. being location in the Southwestern United States, which area is associated with Western genre media programs).

In certain examples, prioritization of media programs may include selecting higher priority media programs for inclusion in a trip playlist and not selecting lower priority media programs for inclusion in the trip playlist. Additionally or alternatively, prioritization of media programs may include arranging selected media programs by priority (e.g., for ordered presentation in a GUI). Additionally or alternatively, trip playlist facility 104 may be configured to prioritize media programs for inclusion and/or arrangement in a trip playlist in any other suitable way.

In certain examples, trip playlist facility 104 may be configured to prioritize media programs identified as being related to a trip based on a relevance scores that indicate levels of relevance of the media programs to the trip. To this end, a trip playlist generation heuristic may specify how a relevance score may be determined for each media program based on identified relationships of the media program to a trip defined by a travel itinerary. For example, trip playlist facility 104 may determine a relevance score for a media program based on a number of identified relationships between the media program and the trip. Additionally or alternatively, trip playlist facility 104 may determine the relevance score for the media program based on specific types of identified relationships between the media program and the trip (e.g., primary versus secondary criteria based relationships). Accordingly, trip playlist facility 104 may be configured to rank media programs that have been identified as having one or more relationships with the trip based on the extent to which the media programs are related to the trip. Such a ranked list may be used by trip playlist facility 104 to select, from a pool of identified media programs, a specific set of media programs to be included in a trip playlist and/or to arrange the selected media programs within the trip playlist.

Figure 6:
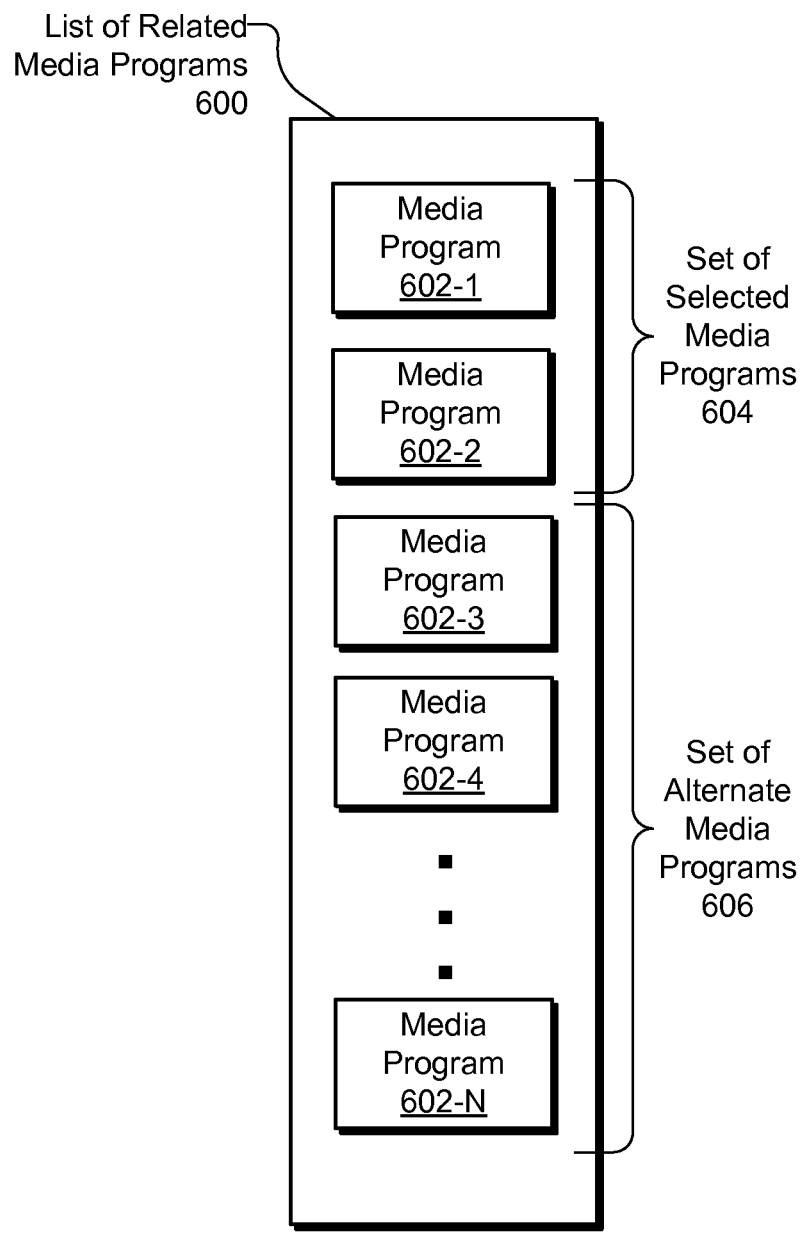
FIG. 6 illustrates a list of media programs identified as being related to a trip and ranked by order of relevance to the trip according to principles described herein.

FIG. 6 illustrates a list 600 of media programs 602 (e.g., media programs 602-1 through 602-N) identified as being related to a trip and ranked by order of relevance to the trip. The list 600 may include any media program that trip playlist facility 104 has identified as being related to the trip and has not been excluded from potential inclusion in a trip playlist based on one or more exclusion criteria (e.g., a duration of a media program being longer than a travel time for the trip).

Trip playlist facility 104 may be configured to select a subset of the media programs 602 included in the list 600 for inclusion in the trip playlist for the trip. To illustrate, in an example in which the trip includes an airline flight from Phoenix, Ariz. to Chicago, Ill., trip playlist facility 104 may select the most relevant media programs 602 included in the list 600 and that fit within the adjusted travel time of the flight. Thus, if the first and second ranked media programs 602-1 and 602-2 fit within the adjusted travel time, trip playlist facility 104 will select the first and second ranked media programs 602-1 and 602-2 and add them to the trip playlist for the trip. FIG. 6 illustrates a set 604 of media programs 602-1 and 602-2 selected by trip playlist facility 104 for inclusion in the trip playlist for the trip. Alternatively, if the total runtime of the first and second ranked media programs 602-1 and 602-2 does not fit within the adjusted travel time of the flight, trip playlist facility 104 may consider one or more next-ranked media programs in the list for inclusion in the trip playlist. For example, if the total runtime of the first and third ranked media programs 602-1 and 602-3 fits within the adjusted travel time of the flight, trip playlist facility 104 may select the first and third ranked media programs 602-1 and 602-3 and add them to the trip playlist.

List 600 may represent a ranking of media programs 602 based on relevance of the media programs to an overall trip, a specific segment of the trip, or to a specific trip element of the trip. For example, list 600 may represent a ranking of media programs 602 based on relevance of the media programs to a specific geographic location associated with the trip. Trip playlist facility 104 may be configured to select any number of media programs 602 from list 600 for addition to a trip playlist.

Trip playlist facility 104 may be configured to arrange media programs to form a trip playlist based on any suitable criteria, including any of the exemplary criteria described herein. In certain examples, this may include arranging selected media programs relative to a timeline of a trip. For a trip that includes an airline flight from Phoenix, Ariz. to Chicago, Ill., for example, the timeline of the trip may begin at the scheduled time of departure from Phoenix, Ariz., cover the scheduled travel time of the flight, and end at the scheduled time of arrival at Chicago, Ill. Trip playlist facility 104 may arrange selected media programs along this timeline based on any suitable criteria.

To illustrate, trip playlist facility 104 may select media programs 602-1 and 602-2 for inclusion in a trip playlist for the trip from Phoenix, Ariz. to Chicago, Ill. Trip playlist facility 104 may also arrange the media programs 602-1 and 602-2 with respect to one another and relative to the timeline of the trip based on any suitable criteria. As an example, trip playlist facility 104 may arrange the media programs 602-1 and 602-2 along the timeline based on the relevance levels of the media programs 602-1 and 602-2 to the trip, with the more relevant media program 602-1 being positioned first in time along the timeline followed by media program 602-2. As another example, trip playlist facility 104 may arrange the media programs 602-1 and 602-2 along the timeline based on relevance to specific trip elements such as the departure location and the destination location. For instance, trip playlist facility 104 may arrange media program 602-1 first in time along the timeline based on media program 602-1 being more relevant to Phoenix, Ariz. than is media program 602-2. Media program 602-2 may be arranged after media program 602-1 along the timeline based on media program 602-1 being less relevant to Phoenix, Ariz. or more relevant to Chicago, Ill. than is media program 602-1.

In certain examples, trip playlist facility 104 may arrange selected media programs relative to a timeline for a trip defined the trip playlist to specify associations between the media programs and one or more elements of the timeline. For example, a timeline may include one or more distinct trip segments (e.g., a first flight may be a first trip segment, and a second flight may be a second trip segment), and trip playlist facility 104 may define the trip playlist to specify an association of each of the media programs with one of the distinct trip segments (e.g., a trip segment in which a media program is recommended for experiencing by a user). In certain implementations, the association with a trip segment may include an association of a media program with a trip element (e.g., a geographic location) included in that trip segment.

The above described examples of selecting and arranging one or more media programs to form a trip playlist are illustrative only. Trip playlist facility 104 may be configured to use any suitable criteria to identify one or more media programs related to a trip defined by a travel itinerary, select any of the identified media programs for inclusion in a trip playlist, and arrange the selected media programs to form the trip playlist. Trip playlist facility 104 may apply the criteria in any suitable order or methodology defined by the trip playlist generation heuristic to identify, select (e.g., filter), and/or arrange media programs to form a trip playlist.

In certain examples, media programs included in a list of media programs identified as being related to a trip but not selected for inclusion in the trip playlist may form a set of alternative media programs for the trip. For example, if trip playlist facility 104 selects media programs 602-1 and 602-2 from list 600 for inclusion in a trip playlist, media programs 602-3 through 602-N may form a set 606 of alternate media programs 602-3 through 602-N for the trip. Trip playlist facility 104 may be configured to use such a set of alternative media programs to provide one or more tools and/or features to a user. As described herein, for example, such a set of alternative media programs may be considered by trip playlist facility 104 as substitutes for media programs included in a trip playlist and/or presented to a user to facilitate user management (e.g., user customization) of the trip playlist.

Trip playlist facility 104 may be configured to notify a user that a generated trip playlist is available to the user. Trip playlist facility 104 may provide a notification in any suitable way, such as via a communication message to the user and/or a notification GUI configured to facilitate user access to the trip playlist and/or options related to the trip playlist. In certain examples, the notification may provide the user with a link to a trip playlist user interface.

Trip playlist facility 104 may be configured to provide a trip playlist user interface through which a user may access, utilize, and/or manage a trip playlist generated by trip playlist facility 104. For example, trip playlist facility 104 may provide a trip playlist GUI for display, the GUI including visual representations of a trip playlist, trip elements, and/or one or more tools configured to facilitate a user viewing the trip playlist, accessing media programs included in the trip playlist, and/or managing (e.g., customizing) the trip playlist. Examples of a trip playlist GUI will now be described.

Figure 7:
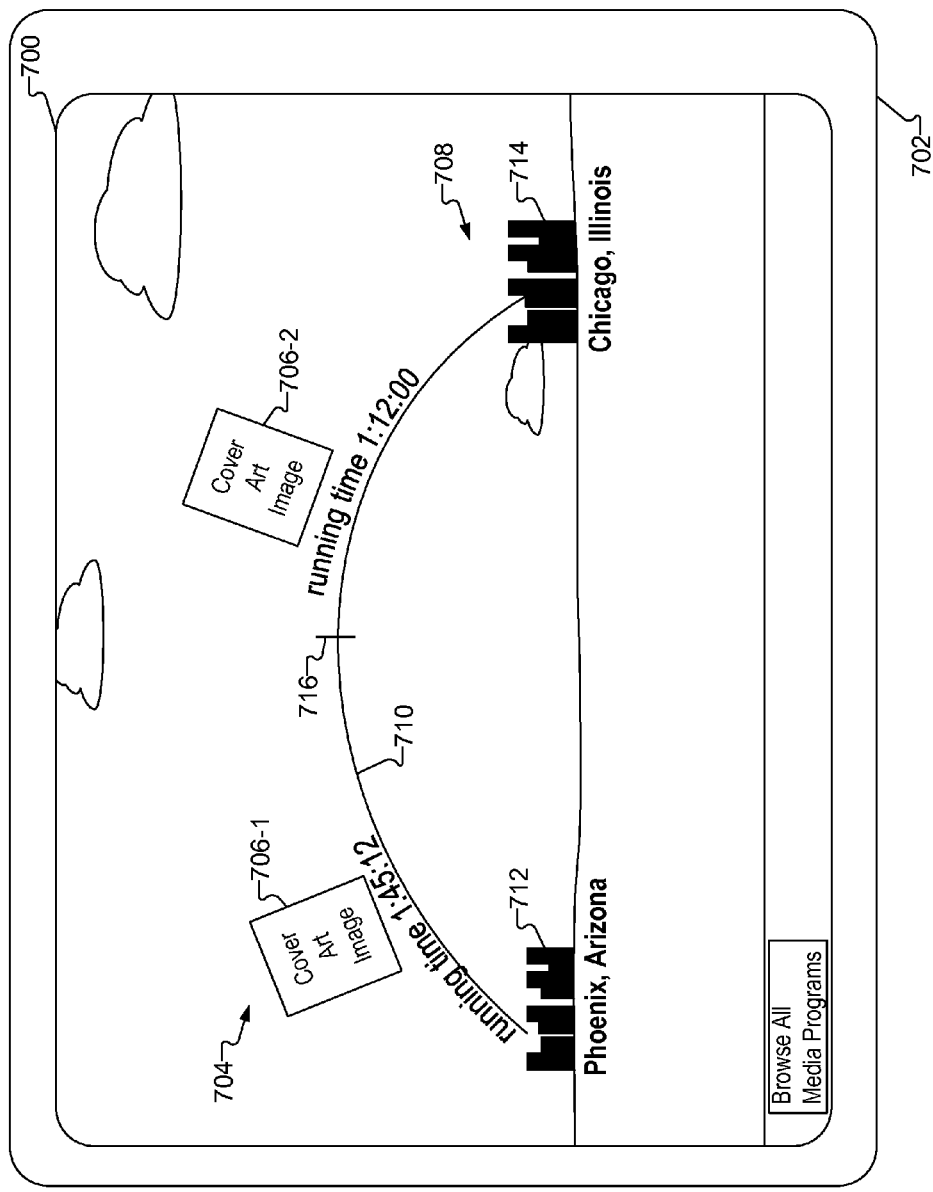
FIGS. 7-11 illustrate exemplary trip playlist graphical user interface views according to principles described herein.

FIG. 7 illustrates an exemplary view of a trip playlist GUI 700 displayed on a display screen of a user computing device 702 ("user device 702"). User device 702 may include any computing device configured to be operated by a user and capable of providing trip playlist GUI 700 for display. In certain examples, user device 702 may include a mobile device that a user may conveniently carry and use while traveling, such as a mobile phone, tablet computer, laptop computer, etc.

System 100 may be implemented in whole or in part by user device 702. For example, system 100 may be implemented entirely by user device 702 (e.g., as an application installed and/or executing on user device 702) or distributed across user device 702 and one or more server computing devices communicatively coupled to user device 702 (e.g., as a client-server implemented application and/or service). In other embodiments, system 100 may be implemented entirely by one or more server computing devices communicatively coupled to user device 702 and configured to provide trip playlist GUI 700 to user device 702 for display.

As shown in FIG. 7, trip playlist GUI 700 may include a visual representation 704 of a trip playlist. In the illustrated example, the visual representation 704 of the trip playlist includes a visual representation of each media program included in the trip playlist. In FIG. 7, this includes cover art images 706 representing the media programs, namely a first cover art image 706-1 representing a first media program and a second cover art image 706-2 representing a second media program included in the trip playlist. In addition to cover art images 706 representing the media programs included the trip playlist, trip playlist GUI 700 may further include information about the media programs. In FIG. 7, for example, the running times of the media programs are displayed proximate the cover art images 706.

The visual representations of the media programs included in the trip playlist may be selectable by a user to access the media programs (e.g., to initiate playback of a media program), one or more menu options associated with the media programs (e.g., menu options configured to be selected to initiate access to and/or playback of a media program), and/or additional information about the media programs. For example, cover art image 706-1 may be configured to be selected by a user to initiate playback of the corresponding media program, to access one or more menu options associated with the corresponding media program (e.g., options to purchase, rent, download, or otherwise access the media program), and/or to access additional information about the corresponding media program.

Trip playlist GUI 700 may also include a visual representation 708 of at least part of the trip associated with the trip playlist. The visual representation 708 of the trip playlist may include one or more visual representations of one or more trip elements of the trip. In FIG. 7, for example, trip playlist GUI 700 includes a visual representation 710 of a timeline for the trip. The visual representation 710 of the timeline visually interconnects a visual representation 712 of a departure location and a visual representation 714 of a destination location for the trip. The visual representation 710 of the timeline may visually represent a travel path and/or a travel time for the trip between the departure location and the destination location for the trip. In the example illustrated in FIG. 7, the trip includes an airline flight from Phoenix, Ariz. to Chicago, Ill. In this example, the trip includes only a single trip segment—the airline flight from Phoenix, Ariz. to Chicago, Ill. Accordingly, the visual representation 710 of the trip timeline may represent the travel time and/or flight path for the flight from Phoenix, Ariz. to Chicago, Ill.

Trip playlist GUI 700 may include a visual representation of one or more associations of media programs included in the trip playlist to one or more trip elements of the trip. For example, trip playlist GUI 700 may visually represent associations of media programs included in the trip playlist to the timeline of the trip. In FIG. 7, for instance, cover art image 706-1 is positioned relative to a location along the visual representation 710 of the timeline to visually indicate an association of the media program represented by cover art image 706-1 to a position along the trip timeline. In the illustrated example, the media program represented by cover art image 706-1 is visually represented to have an association with a portion of the trip timeline that is proximate to the departure location for the trip. As described above, this association may be generated by trip playlist facility 104 for one or more reasons, such as based on an identified relationship between the media program represented by cover art image 706-1 and the Phoenix, Ariz. departure location of the trip. Similarly, in FIG. 7, cover art image 706-2 is positioned along a different portion of the trip timeline to visually indicate an association of the media program represented by cover art image 706-2 to a latter portion of the trip timeline that is proximate the destination location of the trip. In this or any other suitable manner, trip playlist GUI 700 may visually represent associations of media programs included in a trip playlist to specific portions of a trip timeline (e.g., a particular trip segment and/or to a portion of a particular trip segment).

Trip playlist GUI 700 may include a marker 716 positioned along the visual representation 710 of the trip timeline. The marker 716 may visually represent one or more things. For example, the marker 716 may represent a divider between a first portion of the trip timeline that is associated with a first media program represented by cover art image 706-1 and a second portion of the trip timelines that is associated with a second media program represented by cover art image 706-2. As another example, the marker 716 may be positioned along the visual representation 710 of the timeline to recommend a start or a stop time for a playback of a media program. For instance, the marker 716 may represent a recommended time by which a user should begin playback of the media program represented by cover art image 706-2 in order to allow sufficient time to finish the playback of the media program before the end of the flight (e.g., before the user is asked to stop using user device 702 in preparation for the end of the flight). The position of the marker 716 along the visual representation 710 of the trip timeline may be determined and/or adjusted by trip playlist facility 104 based on the running times of the media programs included in the trip playlist and/or a travel time for a trip segment.

Trip playlist GUI 700 may include one or more tools configured to facilitate user management of a trip playlist generated by trip playlist facility 104. For example, trip playlist GUI 700 may include one or more tools configured to facilitate a user editing the trip playlist (e.g., by substituting one or more alternative media programs for one or more of the media programs included in the trip playlist) and/or rearranging the trip playlist (e.g., by reordering one or more media programs included in the trip playlist, which may change associations of the media programs with trip elements of the trip, such as relative to portions of the timeline for the trip). Accordingly, a user may utilize any of the tools in trip playlist GUI 700 to customize the trip playlist generated by trip playlist facility 104.

Figure 8:
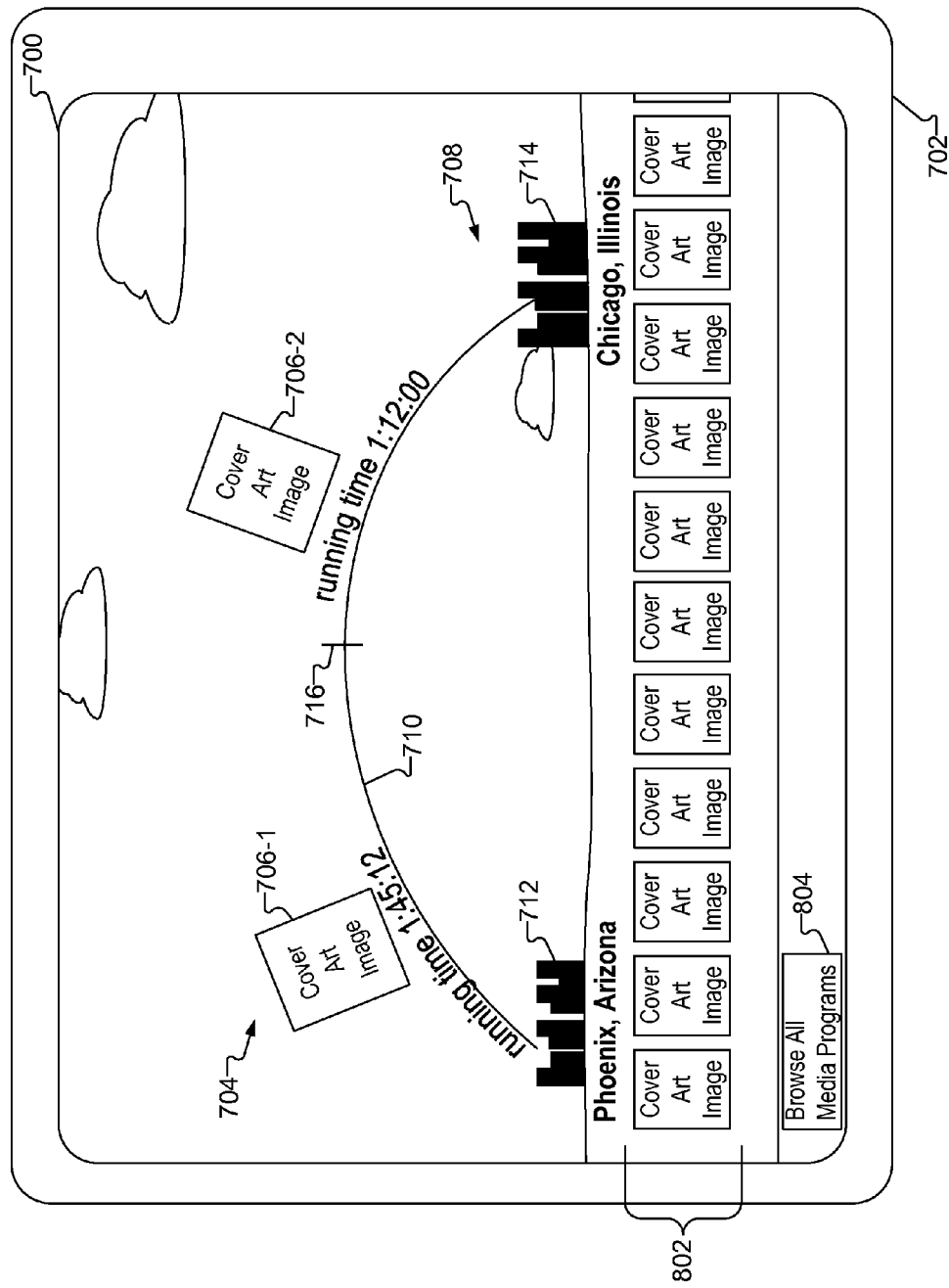

FIG. 8 illustrates another exemplary view of trip playlist GUI 700 displayed on a display screen of user device 702. In FIG. 8, trip playlist GUI 700 includes a trip playlist management tool in the form of a section 802 of alternative recommended media programs for the trip. As shown, section 802 may include visual representations (e.g., cover art images) representing alternative recommended media programs for the trip. In certain examples, section 802 may include visual representations of one or more media programs identified as being related to the trip but not selected for inclusion in the recommended trip playlist by trip playlist facility 104, such as described herein. The visual representations of the alternative recommended media programs may be arranged in any suitable way within section 802, such as based on levels of relevance of the media programs to the trip as determined by trip playlist facility 104.

Trip playlist facility 104 may be configured to edit the trip playlist in response to any suitable form of user input provided by a user to utilize a GUI tool to modify the trip playlist. For example, the user may provide input (e.g., touch input on a touch screen display) to drag and drop cover art images to and/or from the visual representation 704 of the trip playlist and/or section 802 to substitute media programs in and/or out of the trip playlist.

As shown in FIG. 8, trip playlist GUI 700 may also include an option 804 configured to be selected by a user to launch a media program menu view in which the user may browse and/or search all media programs available to the user, such as all media programs available to the user through a media distribution service (including media programs not identified by trip playlist facility 104 is being related to the trip). Through such a media program menu, the user may be able to select other media programs for addition to a trip playlist.

Figure 9:
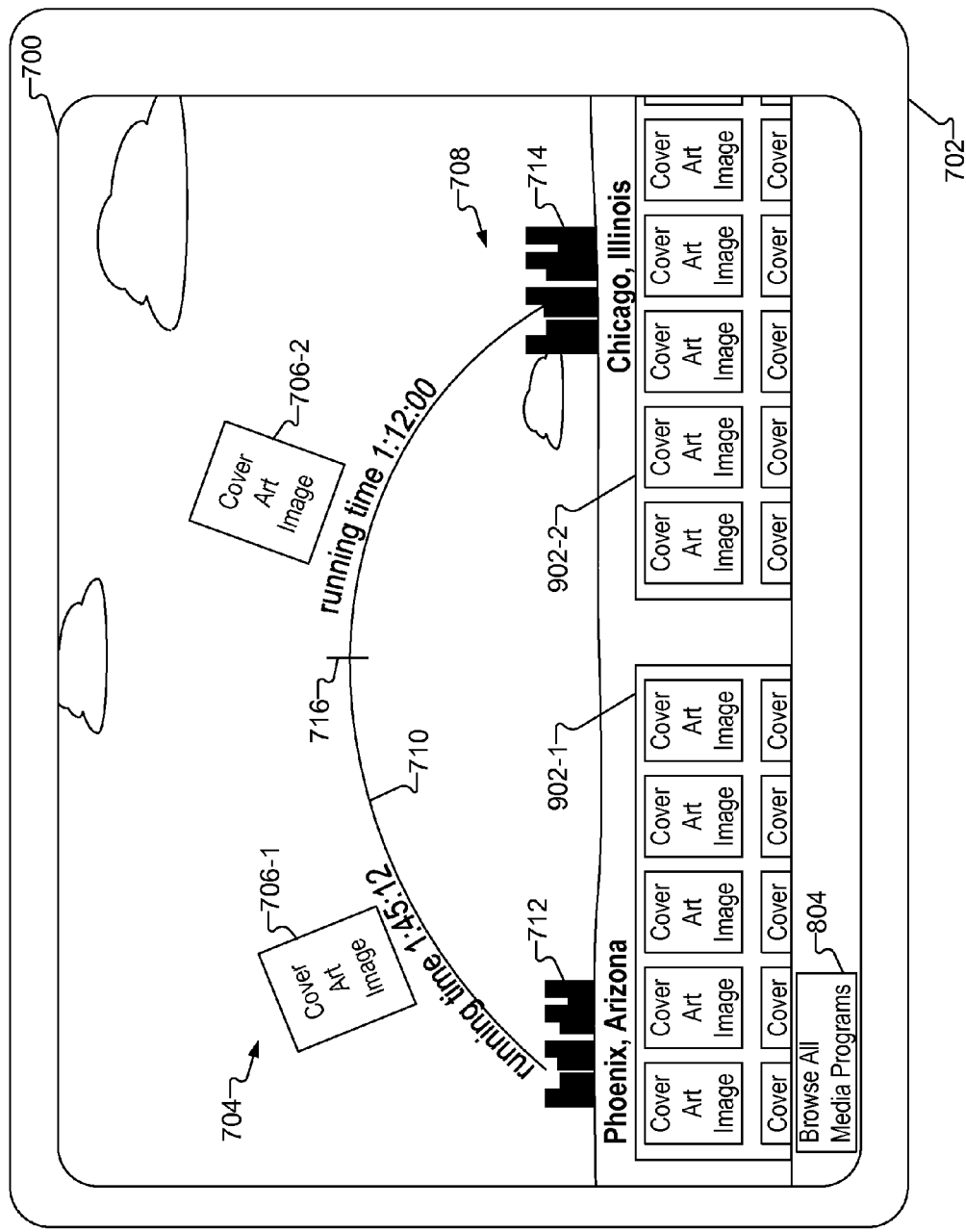

In certain examples, trip playlist GUI 700 may include tools in form of sections of alternative recommended media programs that are specific to trip elements of the trip. For example, FIG. 9 illustrates another exemplary view of trip playlist GUI 700 displayed on a display screen of user device 702. In FIG. 9, trip playlist GUI 700 includes trip playlist management tools in the form of sections 902 (e.g., section 902-1 and section 902-2) of alternative recommended media programs that are specific to trip elements of the trip. For instance, section 902-1 may include visual representations of alternative recommended media programs that are specific to the departure location for the trip, such as media programs that have been identified by trip playlist facility 104 as being related to the departure location for the trip but not selected by trip playlist facility 104 for association with the departure location in the trip playlist. Accordingly, a user may select an alternative media program related to the Phoenix, Ariz. departure location from section 902-1 and manually add the selected alternative media program to the trip playlist (e.g., as a substitute for any media program included in the trip playlist). Similarly, section 902-2 may include visual representations of alternative recommended media programs that are specific to the destination location for the trip, such as media programs that have been identified by trip playlist facility 104 as being related to the destination location for the trip but not selected by trip playlist facility 104 for association with the destination location in the trip playlist.

In certain embodiments, system 100 may be implemented and/or may operate in conjunction with a media distribution service configured to distribute media programs to users of the service. For example, system 100 may be implemented as part of the media distribution service. As another example, system 100 may be configured to communicate and coordinate with the media distribution service. The media distribution service may be configured to distribute media programs to users of the service in any suitable way, such as by way of subscription-based, rental-based, and/or purchase-based access by users to the media programs. Accessed media programs may be delivered to users in any suitable way, such as by streaming and/or downloading digital data representative of the media programs to user devices associated with the users. In certain examples, system 100 may be configured to facilitate downloading of media programs to a user device such that the user device may play back the media programs even when the user device is not communicatively connected to the media distribution service. Accordingly, a user device may download and locally store media programs included in a trip playlist for a trip to the user device before the user of the user device embarks on the trip or a segment of the trip.

Trip playlist facility 104 may be configured to automatically download media programs included in a trip playlist from a media program distribution service to a user device in response to any predetermined event. For example, trip playlist facility 104 may initiate downloading of the media programs included in the trip playlist in response to generation of the trip playlist by trip playlist facility 104, user input confirming the trip playlist, user input requesting access to the media programs in the trip playlist (e.g., a checkout transaction), or any other predetermined event. In certain examples, the media program distribution service may be configured to adjust normal media program access windows (e.g., a thirty-day rental window) to allow media programs that are downloaded for a trip to remain accessible to a user through the completion of the trip.

Figure 10:
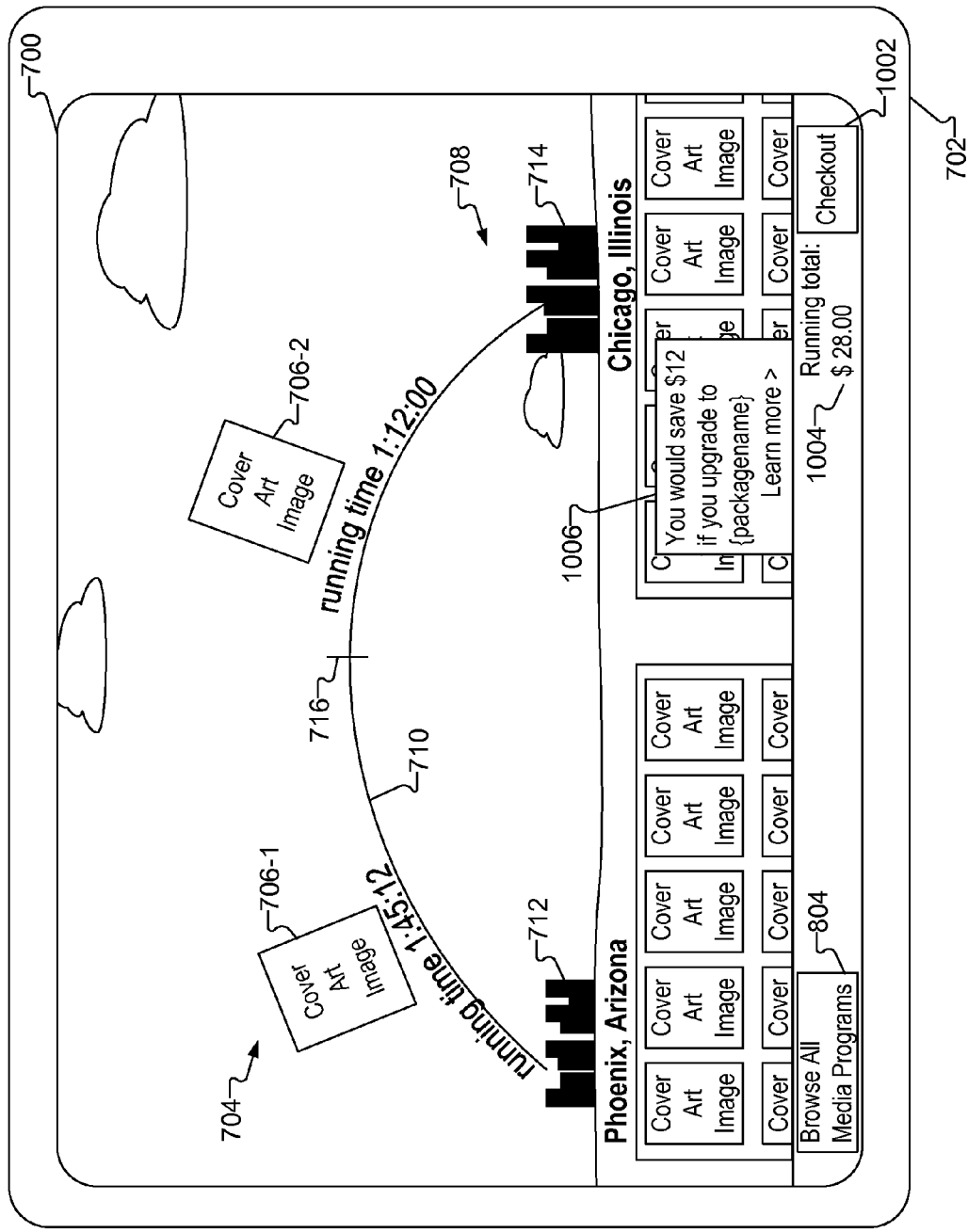

FIG. 10 illustrates another exemplary view of trip playlist GUI 700 displayed on a display screen of user device 702. In FIG. 10, trip playlist GUI 700 includes media program access tools configured to be used by the user of user device 702 to access the media programs included in the trip playlist. For example, trip playlist GUI 700 may include a media program access tool in the form of an option 1002 configured to be selected by the user to initiate a checkout transaction to purchase access to one or more of the media programs included in the trip playlist. Trip playlist GUI 700 may also include an indication 1004 of a running total cost to access the media programs.

In certain examples, trip playlist GUI 700 may include a media program access tool in the form of a visual representation of a promotion that is offered to the user related to accessing the media programs included in the trip playlist. In FIG. 10, for example, trip playlist GUI 700 includes a visual representation 1006 of an offer for the user to upgrade to a particular media distribution service package. As shown, the visual representation 1006 visually indicates a savings that may be had by the user by upgrading to the service package before accessing the media programs included in the trip playlist.

In certain embodiments, the exemplary views of trip playlist GUI 700 illustrated in FIG. 7-10 may be referred to as "trip playlist management views" of trip playlist GUI 700. Such views of trip playlist GUI 700 may be used by a user of user device 702 at any time to manage the trip playlist, particularly before the user embarks on the trip or a segment of the trip and/or when user device 702 has an available connection to the media distribution service. Additionally or alternatively, trip playlist facility 104 may be configured to provide one or more views of trip playlist GUI 700 configured to be used by the user specifically during the trip. Such views may be referred to as "in-trip views" of trip playlist GUI 700.

Figure 11:
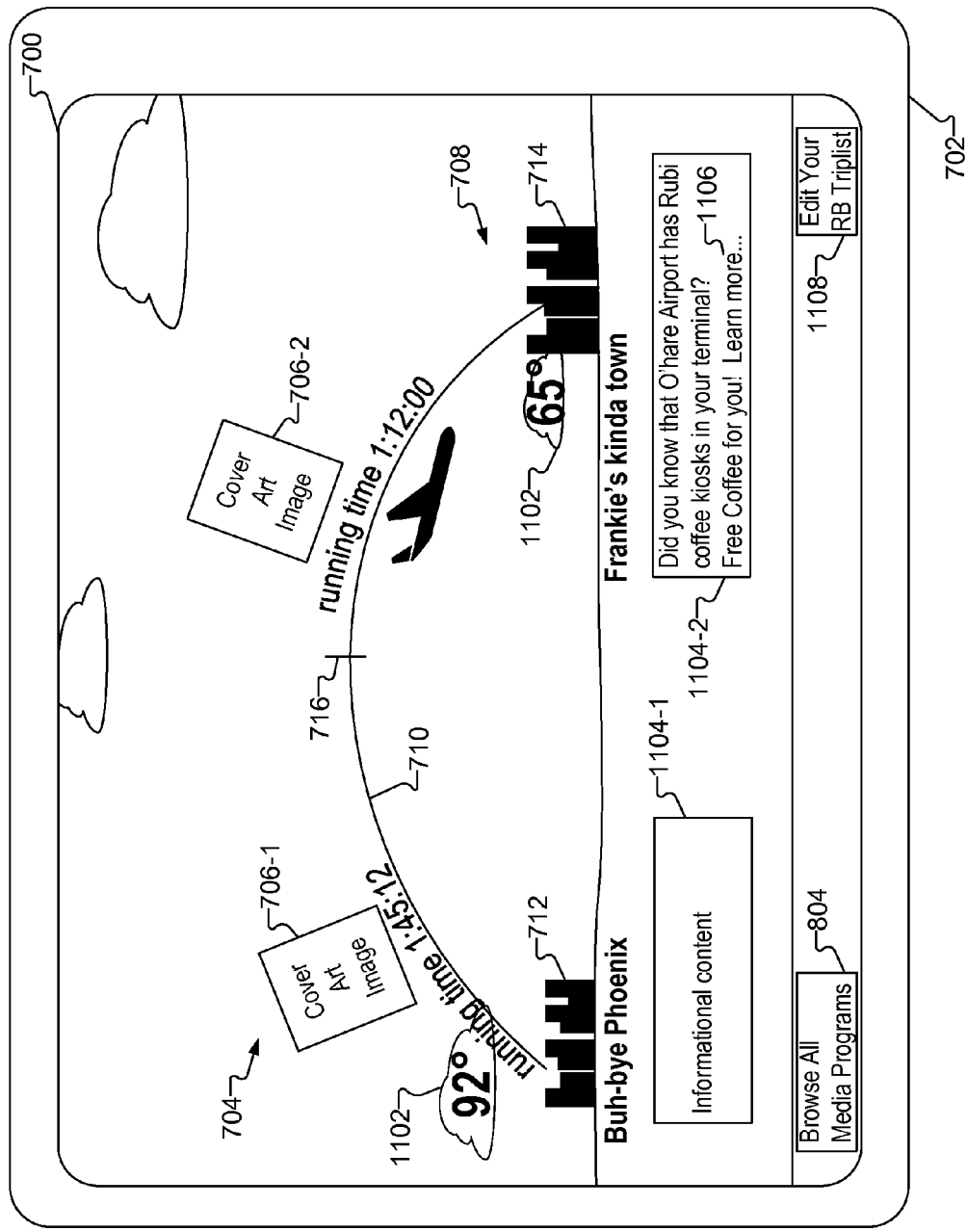

FIG. 11 illustrates an exemplary view of trip playlist GUI 700 that may be displayed on a display screen of user device 702 during a trip. As shown, the illustrated view of trip playlist GUI 700 may include the visual representation 704 of the trip playlist together with the visual representation 708 of the trip. Trip playlist GUI 700 may include additional content, which may be useful to the user during the trip. For example, trip playlist GUI 700 may include visual representations 1102 of weather information (e.g., current weather conditions) for geographic locations associated with the trip. In FIG. 11, visual representations 1102 indicate current temperatures at the departure and destination locations for the trip.

Trip playlist GUI 700 may also include promotional content, social networking content, directional information (e.g., directions to where to go after arriving at the destination location), and/or any other information that may be potentially useful to the user in relation to the trip. In FIG. 11, trip playlist GUI 700 includes information sections 1104 (e.g., information section 1104-1 and information section 1104-2) in which information may be presented to the user. Any informational content may be presented within sections 1104. For example, information section 1104-2 may include information about a promotion that is specific to the destination location for the trip. In the illustrated example, promotional section 1104-2 includes information about a promotion related to a kiosk located in an airport terminal at the destination location. The promotional content includes a user selectable link 1106 to access additional information of the promotion.

Examples of other information that trip playlist GUI 700 may present to user include, without limitation, a food and beverage menu associated with a travel service (e.g., provided by an airline for in-flight food and beverage orders), a duty free shopping catalogue provided by an airline, and information about an availability of and connecting to a computing network associated with a travel service (e.g., a Wi-Fi network provided by a travel service provider). To illustrate, trip playlist GUI 700 may include or provide linked access to a food and beverage menu, a duty free shopping catalogue, and/or information about connecting to a Wi-Fi network provided by an airline.

In FIG. 11, trip playlist GUI 700 includes an option 1108 configured to be selected by the user to access a trip playlist management view of trip playlist GUI 700. In response to a user selection of option 1108, trip playlist facility 104 may provide any of the trip playlist management views of trip playlist GUI 700 described herein for display on the display screen of user device 702.

Trip playlist facility 104 may be configured to update a trip playlist and/or a view of trip playlist GUI 700 based on progress of the user related to the trip playlist and/or the trip. As an example, trip playlist facility 104 may perform such updates in response to a detected progression related to the trip playlist. To illustrate, during the trip, the user may consume (e.g., watch) a media program included in the trip playlist. Trip playlist facility 104 may be configured to detect the playback of the media program and perform one or more updates in response to the playback. For example, trip playlist facility 104 may visually mark, in a GUI view, the media program as having been experienced by the user and/or may remove a visual representation of the media program from the GUI view. Additionally or alternatively, trip playlist facility 104 may remove the media program from the trip playlist after completion of the playback.

As another example, trip playlist facility 104 may be configured to perform one or more updates in response to a progression of the trip. For example, trip playlist facility 104 may be configured to detect any suitable indications of the user having progressed along the path of travel for the trip and may update the trip playlist and/or a view of trip playlist GUI 700 to reflect the progress made. To illustrate, trip playlist facility 104 may be configured to detect, based on a detected location of user device 702 (e.g., a geographic location such as GPS coordinates and/or a network location of user device 702) and may determine from the detected location of user device 702 that the user has made progress along the travel path of the trip. For instance, trip playlist facility 104 may detect that user device 702 has arrived at the destination location for the trip and may update an in-trip view of trip playlist GUI 700 to include an indication that the user has arrived at the destination location. Trip playlist facility 104 may additionally or alternatively update the trip playlist, such as by removing media programs associated with the trip to the destination location from the trip playlist. In this or a similar manner, trip playlist facility 104 may perform updates configured to apprise the user of progress made in experiencing media programs included in the trip playlist and/or along the travel path for the trip.

Trip playlist facility 104 may be configured to update the trip playlist in any suitable way based on progression of the user in experiencing media programs included in the trip playlist and/or in traveling along the travel path of the trip. To illustrate, during a flight from Phoenix, Ariz. to Chicago, Ill. included in a trip, the user may watch the media program represented by cover art image 706-1 but not watch the media program represented by cover art image 706-2 in trip playlist GUI 700. The trip may include a return flight from Chicago, Ill. to Phoenix, Ariz. For this return segment of the trip, trip playlist facility 104 may be configured to update one or more media programs associated with the return flight based at least in part on the user having experienced the media program represented by cover art image 706-1 and not experienced the media program represented by cover art image 706-2 during the flight from Phoenix, Ariz. to Chicago, Ill. For instance, in some examples, trip playlist facility 104 may move the media program represented by cover art image 706-1 from being associated with the outbound flight to being associated with the return flight of the trip. This may include removing one or more media programs that were associated with the return flight of the trip when the trip playlist was initially generated from the trip playlist to make room for the media program represented by cover art image 706-1 to be associated with the return flight. In other examples, trip playlist facility 104 may remove the media program represented by cover art image 706-1 from the trip playlist and add it to the set of alternative recommended media programs. In this or any other suitable way, trip playlist facility 104 may update the trip playlist based on progress made by a user in experiencing media programs included in the trip playlist and/or in traveling along the travel path of the trip.

Additionally or alternatively to generating a trip playlist based at least in part on data representative of a travel itinerary, system 100 may be configured to provide media program recommendations based on a current detected location of a user device. For example, system 100 may detect a geographic location of a user device. The geographic location of the user device may be detected in any suitable way. In certain examples, system 100 may receive GPS coordinates representing the location of the user device as determined by a GPS system. In certain examples, system 100 may detect a near-field communication (e.g., a payment transaction, a Bluetooth communication, etc.) between the user device and a media program vending kiosk that is located at a specific geographic location and determine that the user device is also located at that geographic location.

System 100 may use the location of the user device to identify one or more media programs that are related to the location of the user device and recommend any of the identified media programs to a user of the user device. In certain examples, system 100 may be configured to identify media programs that have a filming location relationship with the current location of the user device. For instance, system 100 may determine, by searching media program data 110 and/or map data 114, that a media program was filmed at a geographic location proximate to the current location of the user device. Based on this determined relationship, system 100 may recommend the media program to the user.

Such a recommendation may be provided to the user in any suitable way. For example, system 100 may provide a notification to the user device that is configured to notify the user of the relationships between the media program and the user's location. The notification may include information about the relationship, the media program, how to access the media program. The notification may also include one or more tools configured to be used by the user to access the media program, menu options related to the media program, and/or additional information about the media program. Such options may include options to stream the media program to the user device, to rent or purchase the media program, and/or to search for and reserve the media program at a media program vending kiosk.

To illustrate, a user may carry his or her user device at a location known as Long Beach, Calif. System 100 may detect that a movie titled "Fun with Dick and Jane" was filmed in Long Beach, California and provide the user with a notification about the filming of the movie at the user's location and one or more options for accessing the movie.

To illustrate another example, as part of a trip (for which system 100 may have generated a trip playlist as described herein), a user may be located at Los Angeles International airport ("LAX") waiting to board a plane for a flight to Chicago, Ill. System 100 may provide the user with a notification (e.g., on the user's user device) that a movie titled "The Naked Gun" was filmed nearby along with options for accessing the movie.

In certain examples, a notification of a media program related to a user's current location may be provided by system 100 in conjunction with any of the exemplary views of trip playlist GUI 700 described herein. The notification may be configured to facilitate a user editing a trip playlist to include the media program that is being recommended based on a relationship with the user's current location. Thus, as a user travels, system 100 may detect the current geographic location of the user device carried by the user and recommend media programs that were filmed nearby the current geographic location or having another relationship with the current geographic location of the user.

In certain examples, system 100 may be configured to provide one or more promotions related to a recommend media program and/or in conjunction with the notification. For example, a notification provided to a user may indicate an available promotion related to the recommended media program, such as a promotion that will allow the user to rent or purchase access to the media program at a discount. The notification may also provide the user with an option to access a map view that indicates relevant locations, such as the user's current location relative to filming locations or other geographic locations related to media programs.

System 100 may be configured to provide additional or alternative recommendations based on a detected current location of a user device. For example, system 100 may recommend video games and/or other content based on the location. As another example, system 100 may recommend and/or provide a service based on the location. For instance, system 100 may provide a game scenario in which users may compete to earn rewards based on numbers of visits that the users make to a particular location (e.g., to one or more media program vending kiosks).

Figure 12:
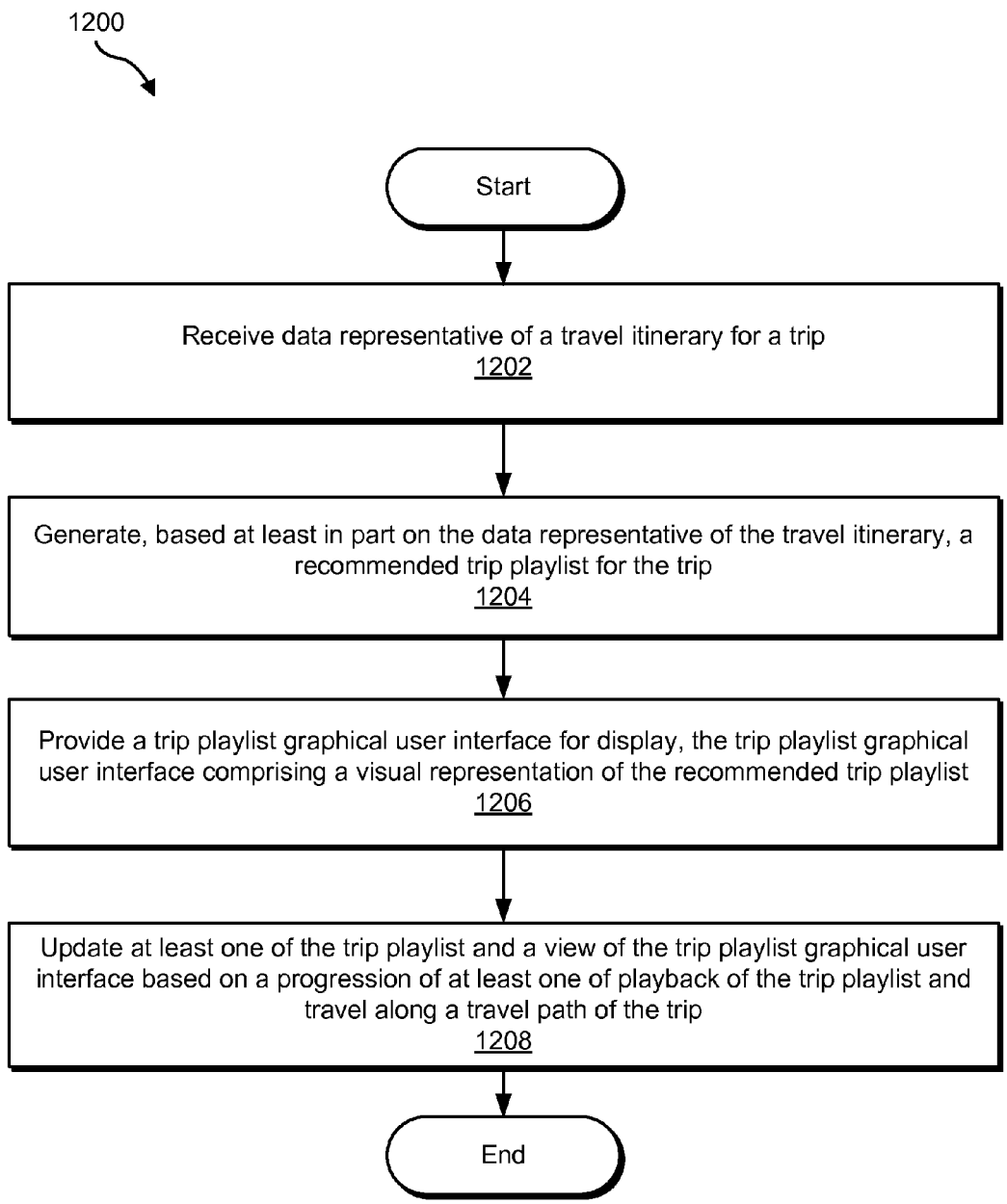
FIGS. 12-13 illustrate exemplary methods according to principles described herein.

FIG. 12 illustrates a trip playlist method 1200 according to principles described herein. While FIG. 12 illustrates exemplary steps according to certain embodiments, other embodiments may omit, add to, reorder, combine, and/or modify any of the steps shown in FIG. 12. In certain embodiments, one or more of the steps shown in FIG. 12 may be performed by system 100 and/or any implementation of system 100.

In step 1202, system 100 receives data representative of a travel itinerary for a trip, such as described herein.

In step 1204, system 100 generates, based at least in part on the data representative of the travel itinerary, a recommended trip playlist for the trip, such as described herein.

In step 1206, system 100 provides a trip playlist graphical user interface for display, the trip playlist GUI including a visual representation of the recommended trip playlist, such as described herein. In certain examples, the trip playlist GUI further includes a visual representation of the trip, and the visual representation of the recommended trip playlist is positioned relative to the visual representation of the trip so as to visually indicate associations between the media programs in the trip playlist and elements of the trip.

In step 1208, system 100 updates at least one of the trip playlist and a view of the trip playlist GUI based on a progression of at least one of playback of the trip playlist and travel along a travel path of the trip, such as described herein.

Figure 13:
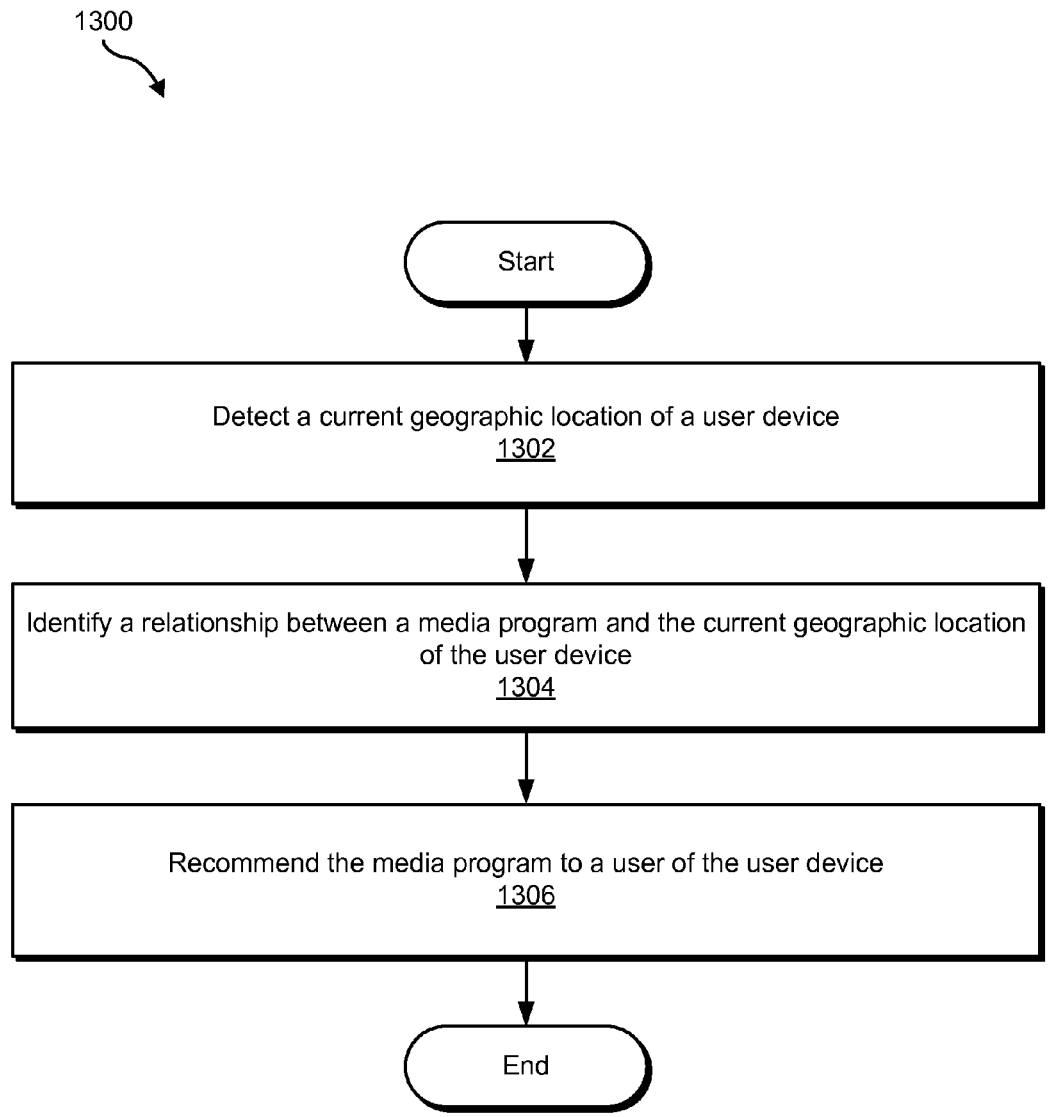

FIG. 13 illustrates an exemplary location-based media program recommendation method 1300 according to principles described herein. While FIG. 13 illustrates exemplary steps according to certain embodiments, other embodiments may omit, add to, reorder, combine, and/or modify any of the steps shown in FIG. 13. In certain embodiments, one or more of the steps shown in FIG. 13 may be performed by system 100 and/or any implementation of system 100.

In step 1302, system 100 detects a current geographic location of a user device, such as described herein.

In step 1304, system 100 identifies a relationship between a media program and the current geographic location of the user device, such as described herein. For example, system 100 may determine that the current geographic location of the user device is at or proximate to a location at which production of the media program (e.g., filming of a movie) occurred.

In step 1306, system 100 recommends the media program to a user of the user device (e.g., in response to steps 1302 and 1304) in any of the ways described herein. In certain examples, system 100 may provide a recommendation in conjunction with a trip playlist and/or trip playlist GUI, which may be configured to facilitate the user considering the recommended media program for addition to a trip playlist.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
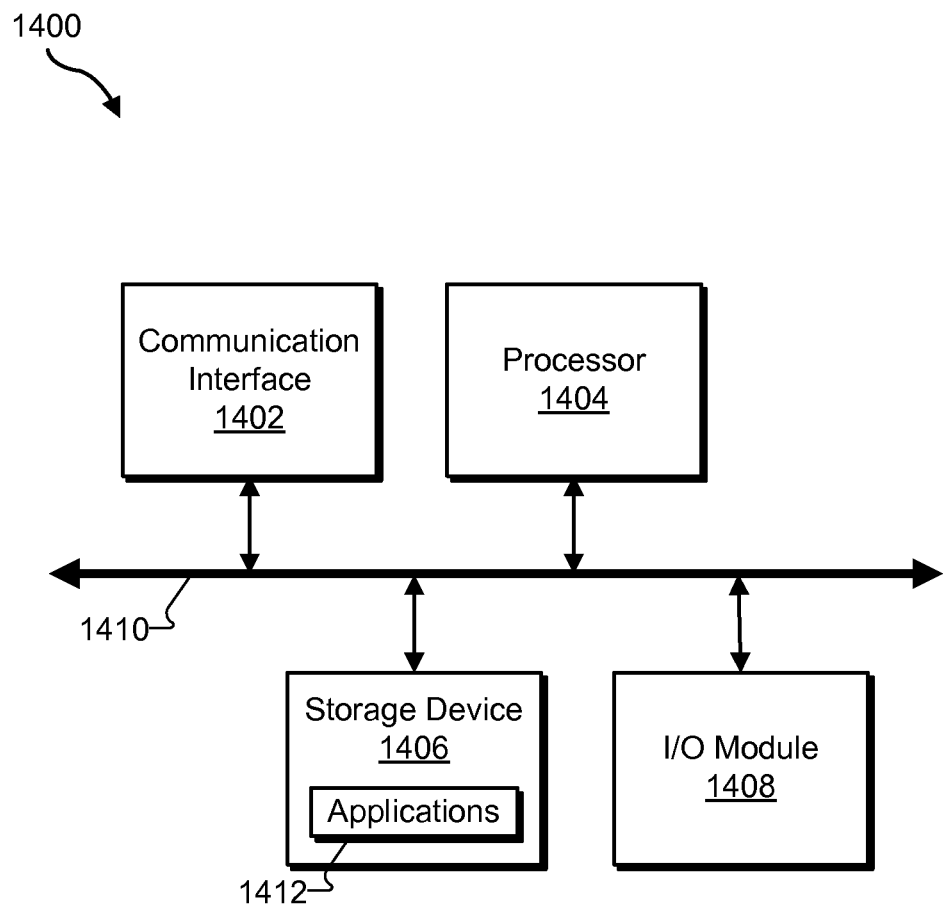
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 (which may include one or more software applications 102 included in suite 100) or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with travel itinerary facility 102 and/or trip playlist facility 104. Likewise, storage facility 106 may be implemented by or within storage device 1406. Such an implementation may be referred to a computer-implemented system, such as a computer-implemented trip playlist management system 100.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a computer-implemented trip playlist management system, data representative of a travel itinerary for a planned trip in advance of the planned trip;
   generating, by the computer-implemented trip playlist management system based on the data representative of the travel itinerary, a recommended trip playlist for the planned trip, the recommended trip playlist comprising a set of one or more media programs selected and arranged relative to a timeline for the planned trip; and
   providing, by the computer-implemented trip playlist management system, a trip playlist graphical user interface for display, the trip playlist graphical user interface comprising a visual representation of the recommended trip playlist and a visual representation of the timeline for the planned trip, the visual representation of the timeline for the planned trip visually interconnecting a visual representation of a departure location for the planned trip and a visual representation of a destination location for the planned trip.

2. The method of claim 1, wherein:
   the travel itinerary specifies a geographic location associated with the planned trip; and
   the generating of the recommended trip playlist comprises:
      identifying a relationship between a media program and the geographic location, and
      selecting the media program for inclusion in the set of one or more media programs included in the recommended trip playlist based on the relationship between the media program and the geographic location.

3. The method of claim 2, wherein the geographic location comprises at least one of a trip departure location, a trip waypoint location, and a trip destination location.

4. The method of claim 2, wherein the generating of the recommended trip playlist further comprises arranging the media program relative to the timeline for the planned trip based on the relationship between the media program and the geographic location.

5. The method of claim 1, wherein:
   the timeline comprises one or more distinct trip segments; and
   the trip playlist specifies an association of each media program included in the set of one or more media programs with a distinct trip segment included in the one or more distinct trip segments.

6. The method of claim 1, wherein the trip playlist graphical user interface further comprises
   a visual representation of one or more associations of the one or more media programs included in the recommended trip playlist to the timeline.

7. The method of claim 6, wherein the visual representation of the recommended trip playlist comprises one or more visual representations of the one or more media programs included in the recommended trip playlist and positioned relative to the timeline to visually represent the one or more associations of the one or more media programs included in the recommended trip playlist to the timeline.

8. The method of claim 1, wherein the trip playlist graphical user interface includes a tool configured to facilitate user editing of the recommended trip playlist.

9. The method of claim 8, wherein the tool comprises a section of user selectable visual representations of alternative media programs identified by the computer-implemented trip playlist management system as being related to the planned trip but not selected by the computer-implemented trip playlist management system for inclusion in the recommended trip playlist.

10. The method of claim 9, wherein the section is specific to a trip element of the planned trip, the alternative media programs identified by the computer-implemented trip playlist management system as being related to the trip element but not selected by the computer-implemented trip playlist management system for association with the trip element in the recommended trip playlist.

11. The method of claim 6, further comprising:
    detecting, by the computer-implemented trip playlist management system, a progression of travel along a travel path of the planned trip; and
    updating, by the computer-implemented trip playlist management system based on the detected progression of travel, at least one of
       the visual representation of the timeline in the trip playlist graphical user interface, and
       the visual representation of the recommended trip playlist in the trip playlist graphical user interface.

12. The method of claim 1, further comprising:
    detecting, by the computer-implemented trip playlist management system, a progression of playback of a media program included in the recommended trip playlist; and
    updating, by the computer-implemented trip playlist management system based on the detected progression of the playback of the media program, the visual representation of the recommended trip playlist in the trip playlist graphical user interface.

13. The method of claim 1, further comprising:
    detecting, by the computer-implemented trip playlist management system, a current location of a user device;
    identifying, by the computer-implemented trip playlist management system, a relationship between a media program and the current location of the user device; and
    providing, by the computer-implemented trip playlist management system, a notification recommending the media program to a user of the user device.

14. The method of claim 1, embodied as computer-executable instructions on at least one non-transitory computer-readable medium.

15. A method comprising:
    receiving, by a computer-implemented trip playlist management system, data representative of a travel itinerary for a planned trip in advance of the planned trip;

generating, by the computer-implemented trip playlist management system based on the data representative of the travel itinerary, a recommended trip playlist for the planned trip, the recommended trip playlist comprising a set of one or more media programs selected and arranged relative to a timeline for the planned trip; and providing, by the computer-implemented trip playlist management system, a trip playlist graphical user interface for display, the trip playlist graphical user interface comprising a visual representation of the recommended trip playlist relative to a visual representation of the timeline for the planned trip, the visual representation of the timeline for the planned trip visually interconnecting a visual representation of a departure location for the planned trip and a visual representation of a destination for the planned trip.

16. The method of claim 15, wherein the visual representation of the recommended trip playlist relative to the visual representation of the timeline for the planned trip visually indicates one or more associations of the one or more media programs included in the recommended trip playlist to one or more portions of the timeline.

17. The method of claim 16, wherein:
the one or more media programs include a first media program related to a first geographic location associated with the planned trip and a second media program related to a second geographic location associated with the planned trip; and
the one or more associations of the one or more media programs included in the recommended trip playlist to one or more portions of the timeline include a first association of the first media program to a first portion of the timeline and a second association of the second media program to a second portion of the timeline.

18. The method of claim 15, embodied as computer-executable instructions on at least one non-transitory computer-readable medium.

19. A system comprising:
at least one processor; and
a travel itinerary facility that directs the at least one processor to:
receive data representative of a travel itinerary for a planned trip in advance of the planned trip,
generate, based on the data representative of the travel itinerary, a recommended trip playlist for the planned trip, the recommended trip playlist comprising a set of one or more media programs selected and arranged relative to a timeline for the planned trip, and
provide a trip playlist graphical user interface for display, the trip playlist graphical user interface comprising a visual representation of the recommended trip playlist and a visual representation of the timeline for the planned trip, the visual representation of the timeline for the planned trip visually interconnecting a visual representation of a departure location for the planned trip and a visual representation of a destination location for the planned trip.

20. The method of claim 1, wherein:
the data representative of the travel itinerary for the planned trip indicates multiple geographic locations associated with the planned trip; and
the timeline for the planned trip comprises at least one estimated duration of time to travel between the multiple geographic locations associated with the planned trip.

21. The method of claim 1, wherein the data representative of the travel itinerary for the planned trip indicates:
multiple geographic locations associated with the planned trip; and
a time associated with each of the multiple geographic locations associated with the planned trip.

22. The method of claim 1, further comprising receiving, by the computer-implemented trip playlist management system, data representative of at least one of a user profile, a preference specified by a user, and a media consumption history associated with the user;
wherein the generating of the recommended trip playlist for the planned trip is further based on the data representative of the at least one of the user profile, the preference specified by the user, and the media consumption history associated with the user.

23. The system of claim 19, wherein:
the travel itinerary facility further directs the at least one processor to receive data representative of at least one of a user profile, a preference specified by a user, and a media consumption history associated with the user; and
the generation of the recommended trip playlist for the planned trip is further based on the data representative of the at least one of the user profile, the preference specified by the user, and the media consumption history associated with the user.

* * * * *